United States Patent
Palumbo et al.

(10) Patent No.: US 7,553,553 B2
(45) Date of Patent: Jun. 30, 2009

(54) ARTICLE COMPRISING A FINE-GRAINED METALLIC MATERIAL AND A POLYMERIC MATERIAL

(75) Inventors: Gino Palumbo, Toronto (CA); Jonathan McCrea, Toronto (CA); Klaus Tomantschger, Mississauga (CA); Iain Brooks, Toronto (CA); Daehyun Jeong, Oakville (CA); Dave Limoges, Etobicoke (CA); Konstantinos Panagiotopoulos, Toronto (CA); Uwe Erb, Toronto (CA); Andrew Wang, Toronto (CA)

(73) Assignee: Integran Technologies, Inc., Toronto (CA)

( * ) Notice: Subject to any disclaimer, the term of this patent is extended or adjusted under 35 U.S.C. 154(b) by 77 days.

(21) Appl. No.: 12/000,352

(22) Filed: Dec. 12, 2007

(65) Prior Publication Data
US 2008/0090066 A1 Apr. 17, 2008

Related U.S. Application Data

(63) Continuation of application No. 11/300,579, filed on Dec. 15, 2005, now Pat. No. 7,354,354, which is a continuation-in-part of application No. 11/013,456, filed on Dec. 17, 2004, now Pat. No. 7,387,578.

(51) Int. Cl.
*B32B 15/08* (2006.01)
*A63B 53/12* (2006.01)
*A63B 53/10* (2006.01)
(52) U.S. Cl. .............. 428/626; 428/413; 428/458; 428/459; 428/461; 428/412
(58) Field of Classification Search .......... None
See application file for complete search history.

(56) References Cited

U.S. PATENT DOCUMENTS

| | | | |
|---|---|---|---|
| 3,597,266 A | 8/1971 | Leibowitz et al. |
| 3,616,296 A | 10/1971 | Bernhardt et al. |
| 3,625,039 A | 12/1971 | Kubach et al. |
| 3,640,789 A | 2/1972 | Hepfer |
| 3,655,433 A | 4/1972 | Poppe et al. |
| 3,692,502 A | 9/1972 | Bernhardt et al. |
| 3,749,021 A | 7/1973 | Burgess |
| 3,806,429 A | 4/1974 | Clauss et al. |
| 3,856,613 A | 12/1974 | Weller |
| 3,867,264 A | 2/1975 | Carson |
| 3,949,988 A | 4/1976 | Staufer |
| 3,974,044 A | 8/1976 | Tremmel |

(Continued)

FOREIGN PATENT DOCUMENTS

EP 0 341 643 A1 11/1989

(Continued)

*Primary Examiner*—John J. Zimmerman
*Assistant Examiner*—Aaron Austin
(74) *Attorney, Agent, or Firm*—Bacon & Thomas, PLLC

(57) ABSTRACT

Lightweight articles comprising a polymeric material at least partially coated with a fine-grained metallic material are disclosed. The fine-grained metallic material has an average grain size of 2 nm to 5,000 nm, a thickness between 25 micron and 5 cm, and a hardness between 200 VHN and 3,000 VHN. The lightweight articles are strong and ductile and exhibit high coefficients of restitution and a high stiffness and are particularly suitable for a variety of applications including aerospace and automotive parts, sporting goods, and the like.

4 Claims, 7 Drawing Sheets

U.S. PATENT DOCUMENTS

| | | | |
|---|---|---|---|
| 4,084,819 A | 4/1978 | Van Auken |
| 4,124,208 A | 11/1978 | Burns |
| 4,179,343 A | 12/1979 | Tremmel |
| 4,188,032 A | 2/1980 | Yanagioka |
| 4,218,937 A | 8/1980 | Albrecht et al. |
| 4,315,045 A | 2/1982 | Dillard et al. |
| 4,319,750 A | 3/1982 | Roy |
| 4,369,670 A | 1/1983 | Papenhagen et al. |
| 4,398,758 A | 8/1983 | Tabares |
| 4,429,020 A | 1/1984 | Luch |
| 4,533,146 A | 8/1985 | Schaar |
| 4,552,626 A | 11/1985 | Stevenson |
| 4,556,607 A | 12/1985 | Sastri |
| 4,598,457 A | 7/1986 | Kiwak et al. |
| 4,604,168 A | 8/1986 | Liu et al. |
| 4,671,552 A | 6/1987 | Anderson et al. |
| 4,906,532 A | 3/1990 | Spencer, Jr. |
| 4,951,953 A | 8/1990 | Kim |
| 4,999,227 A | 3/1991 | Vander Togt |
| 5,015,339 A | 5/1991 | Pendleton |
| 5,022,371 A | 6/1991 | Daly |
| 5,028,464 A | 7/1991 | Shigetoh |
| 5,074,163 A | 12/1991 | Baumann |
| 5,131,986 A | 7/1992 | Harada et al. |
| 5,147,692 A | 9/1992 | Bengston |
| 5,178,956 A | 1/1993 | Rychwalski et al. |
| 5,302,414 A | 4/1994 | Alkhimov et al. |
| 5,320,386 A | 6/1994 | Harmala et al. |
| 5,321,995 A | 6/1994 | Zedan |
| 5,324,032 A | 6/1994 | Minami |
| 5,352,266 A | 10/1994 | Erb et al. |
| 5,376,248 A | 12/1994 | Conrod et al. |
| 5,421,989 A | 6/1995 | Stamp et al. |
| 5,433,797 A | 7/1995 | Erb et al. |
| 5,437,450 A | 8/1995 | Akatsuka et al. |
| 5,472,202 A | 12/1995 | Yamanaka |
| 5,485,997 A | 1/1996 | Schmidt et al. |
| 5,524,331 A | 6/1996 | Pond |
| 5,533,421 A | 7/1996 | Damerow et al. |
| 5,538,769 A | 7/1996 | Sandman, Jr. |
| 5,547,558 A | 8/1996 | Sakamoto et al. |
| 5,575,181 A | 11/1996 | Baumann |
| 5,597,471 A | 1/1997 | Ragge et al. |
| 5,599,242 A | 2/1997 | Solviche et al. |
| 5,603,667 A | 2/1997 | Ezaki et al. |
| 5,655,981 A | 8/1997 | Reed |
| 5,665,441 A | 9/1997 | Suzue et al. |
| 5,686,155 A | 11/1997 | Suzue et al. |
| 5,713,800 A | 2/1998 | Su |
| 5,755,826 A | 5/1998 | Beach et al. |
| 5,759,378 A | 6/1998 | Ferrier et al. |
| 5,851,158 A | 12/1998 | Winrow et al. |
| 5,881,605 A | 3/1999 | Doolittle et al. |
| 5,900,199 A | 5/1999 | Dickson et al. |
| 5,935,018 A | 8/1999 | Takeda |
| 5,941,329 A | 8/1999 | Ichioka et al. |
| 5,967,904 A | 10/1999 | Nagai et al. |
| 6,010,196 A | 1/2000 | Wang et al. |
| 6,076,802 A | 6/2000 | Maier |
| 6,106,417 A | 8/2000 | Umlauft et al. |
| 6,139,444 A | 10/2000 | Renard et al. |
| 6,152,504 A | 11/2000 | Dickson et al. |
| 6,168,836 B1 | 1/2001 | Kukanskis et al. |
| 6,179,736 B1 | 1/2001 | Thurber |
| 6,193,614 B1 | 2/2001 | Sasamoto et al. |
| 6,334,824 B1 | 1/2002 | Filice et al. |
| 6,346,052 B1 | 2/2002 | Chappell |
| 6,354,960 B1 | 3/2002 | Perryman et al. |
| 6,403,168 B2 | 6/2002 | Meyer et al. |
| 6,468,672 B1 | 10/2002 | Donovan, III et al. |
| 6,509,107 B2 | 1/2003 | Ding et al. |
| 6,582,320 B2 | 6/2003 | Fendel |
| 6,645,557 B2 | 11/2003 | Joshi |
| 6,679,788 B1 | 1/2004 | Heinrich et al. |
| 6,692,377 B2 | 2/2004 | Galloway |
| 6,706,326 B1 | 3/2004 | Hartogs et al. |
| 6,712,948 B1 | 3/2004 | Naruskevicius et al. |
| 6,729,970 B2 | 5/2004 | Horwood et al. |
| 6,802,232 B2 | 10/2004 | Buckley et al. |
| 6,805,642 B2 | 10/2004 | Meyer |
| 6,845,716 B2 | 1/2005 | Husseini et al. |
| 6,860,821 B2 | 3/2005 | Unosawa et al. |
| 6,869,372 B1 | 3/2005 | Higgenbotham et al. |
| 6,869,732 B2 | 3/2005 | Takeuchi et al. |
| 6,902,778 B2 | 6/2005 | Marentette et al. |
| 6,915,964 B2 | 7/2005 | Tapphorn et al. |
| 7,109,375 B2 | 9/2006 | Herdman et al. |
| 7,318,781 B2 | 1/2008 | Deshmukh |
| 2001/0051549 A1 | 12/2001 | Inoue et al. |
| 2002/0034985 A1 | 3/2002 | Perryman et al. |
| 2002/0061374 A1 | 5/2002 | O'Brien et al. |
| 2002/0082111 A1 | 6/2002 | Hedrick et al. |
| 2002/0098906 A1 | 7/2002 | Hsu |
| 2002/0119829 A1 | 8/2002 | Cheng |
| 2004/0043825 A1 | 3/2004 | Horwood et al. |
| 2004/0055675 A1 | 3/2004 | Kuramoto et al. |
| 2004/0092329 A1 | 5/2004 | Meyer |
| 2004/0092330 A1 | 5/2004 | Meyer et al. |
| 2004/0121864 A1 | 6/2004 | Morrow et al. |
| 2004/0147346 A1 | 7/2004 | Casasanta, Jr. |
| 2004/0244888 A1 | 12/2004 | Horimura et al. |
| 2005/0093266 A1 | 5/2005 | Smith et al. |
| 2005/0103408 A1 | 5/2005 | Kuehmann et al. |
| 2005/0107182 A1 | 5/2005 | Meyer et al. |
| 2005/0124433 A1 | 6/2005 | Scruggs et al. |
| 2005/0161103 A1 | 7/2005 | Lindsay |
| 2006/0160636 A1 | 7/2006 | Palumbo et al. |
| 2006/0193742 A1 | 8/2006 | Miura et al. |
| 2007/0293348 A1 | 12/2007 | Hocknell et al. |

FOREIGN PATENT DOCUMENTS

| | | |
|---|---|---|
| JP | 0629745 A | 10/1994 |
| JP | 9-266967 | 10/1997 |
| JP | 9-285569 A | 11/1997 |
| JP | 2000-61005 A | 2/2000 |
| WO | WO 04/001100 A1 | 12/2003 |
| WO | WO 2004/074550 A1 | 9/2004 |
| WO | WO 2004/092450 A1 | 10/2004 |
| WO | WO 2004/094699 A1 | 11/2004 |

ARTICLE COMPRISING A FINE-GRAINED METALLIC MATERIAL AND A POLYMERIC MATERIAL

CROSS-REFERENCE TO RELATED APPLICATION

This is a continuation of U.S. application Ser. No. 11/300,579, filed Dec. 15, 2005, which is a Continuation-in-Part of U.S. application Ser. No. 11/013,456, filed Dec. 17, 2004.

FIELD OF THE INVENTION

This invention relates to applying thick (>25 µm), fine-grained (average grain size 2 nm to 5,000 nm) metals, metal alloys or metal matrix composites with high specific strength, toughness and resilience (>0.25 MPa) to polymeric substrates in order to achieve a structural shell. Articles made according to the invention find use in a variety of applications where the use of the high strength structural shell on a polymer or composite substrate allows for substantial weight savings. Applications include automotive components, aerospace parts, defense parts, consumer products, medical components and sporting goods. Suitable industrial parts include, among others, tubes or shafts used, e.g., in sporting goods such as ski and hiking poles, fishing rods, golf club shafts, hockey sticks, lacrosse sticks, baseball/softball bats, bicycle frames, skate blades, snow boards; plates such as golf club head face plates; as well as complex shapes such as sports racquets (tennis, racquetball, squash and the like), golf club heads, automotive grill-guards; brake, gas or clutch pedals; fuel rails; running boards; spoilers; muffler tips, wheels, vehicle frames, structural brackets and the like. Parts are at least partially coated with said fine-grained metallic materials.

The invention also relates to depositing fine-grained metallic materials directly onto suitable substrates such as cylindrical, conical or tapered shafts. Alternatively, fine-grained metallic plates or foils and the like can be formed and subsequently applied using adhesives to suitable substrates to produce strong, ductile, lightweight components requiring a high modulus of resilience, a high coefficient of restitution and a high torsional stiffness.

BACKGROUND OF THE INVENTION

A variety of applications require articles to be strong, wear resistant, lightweight and to display high specific strength, high impact toughness and high flexural stiffness while being manufactured by a convenient and cost-effective method.

(2: Metal Coating Processes)

A number of metal deposition techniques including electrolytic, electroless plating and powder-coating processes are known to apply metallic coatings to surfaces of various articles such as sporting goods, automotive articles and the like.

(2.1. Electroless Coating)

Electroless coating processes are used commercially particularly for Ni, Cu and Ag. Electroless coating deposition rates are low, typically 0.25 mil/hr (6.35 µm/hr) to 0.5 mil/hr (12.7 µm/hr) and yield an amorphous microstructure. Typical coating thickness values for electroless plating processes are much lower than 1 mil (25 µm) and primarily applied to enhance the appearance, or improve the scratch and the corrosion resistance. Leibowitz in U.S. Pat. No. 3,597,266 (1971) describes a popular electroless Ni plating process.

(2.2. Conventional Electroplating)

A variety of electroplating processes are known to deposit conventional coarse-grained metallic coatings on substrates at deposition rates that typically exceed 1 mil/hr (25 µm/hr) and are commercially available for a number of chemistries including Cu, Co, Ni, Cr, Sn, Zn. In the case of galvanic coatings it is well known that after the coating has been built up to a thickness of about 5-10 µm, it tends to become highly textured and grows in a fashion whereby anisotropic and elongated columnar grains prevail with typical grain widths of a few microns and grain lengths of tens of microns. Prior art thin coatings applied by conventional electroplating processes exhibit conventional average grain sizes ($\geq$10 µm) and do not significantly enhance the overall mechanical properties of the coated article, thus not providing a structural shell.

Donavan in U.S. Pat. No. 6,468,672 (2002) discloses a process for forming a decorative chromium plating having good corrosion resistance and thermal cycling characteristics on a plastic substrate by first depositing an electrically conductive coating on the plastic substrate followed by electrodepositing a high leveling semi-bright nickel electroplate layer, followed by electrodepositing a bright nickel electroplate layer, and finally followed by electrodepositing a chromium layer.

(2.3: Fine-Grained Electroplating)

Recently it has been recognized that a substantial reduction of the average grain size strongly enhances selected physical, chemical and mechanical properties of metallic materials. For example, in the case of nickel, the ultimate tensile strength increases from 400 MPa (for conventional grain-sizes greater than 5 µm) to 1,000 MPa (grain size of 100 nm) and ultimately to over 2,000 MPa (grain size 10 nm). Similarly, the hardness for nickel increases from 140 VHN (for conventional grain-sizes greater than 5 µm) to 300 VHN (grain size of 100 nm) and ultimately to 650 VHN (grain size 10 nm). Electroplated fine-grained metallic materials of improved durability and performance characteristics are known in the prior art including:

Erb in U.S. Pat. No. 5,352,266 (1994), and U.S. Pat. No. 5,433,797 (1995), assigned to the applicant of this application, describes a process for producing nanocrystalline metallic materials, particularly nanocrystalline nickel with an average grain size of less than 100 nm using pulse electrodeposition and an aqueous electrolytic cell. Products of the invention include wear resistant coatings and magnetic materials.

Palumbo DE 10,288,323 (2005) (=WO2004/001100 A1 2002) also assigned to the applicant of this application, discloses a process for forming coatings or freestanding deposits of nanocrystalline metals, metal alloys or metal matrix composites. The process employs tank, drum or selective plating processes. Novel nanocrystalline metal matrix composites and micro-components are disclosed as well.

(2.4: Alternative Fine-Grained Coating Processes)

Various patents disclose low temperature powder spray processes for the preparation of metallic coatings.

Alkhimov in U.S. Pat. No. 5,302,414 (1991) describes a cold gas-dynamic spraying method for applying a coating to an article by introducing metal or metal alloy powders, polymer powders or mechanical mixtures thereof into a gas stream. The gas and particles (average particle size range: 1 to 50 microns) form a supersonic jet (velocity: 300 to 1,200 m/sec) at a temperature considerably below the fusing temperature of the powder material. The jet is directed against an article of a metal, alloy or dielectric, thereby coating the article with the particles.

Tapphorn in U.S. Pat. No. 6,915,964 (2005) describes a spraying process for forming coatings by solid-state deposition and consolidation of powder particles. The subsonic or sonic gas jet containing the particles is directed onto the surface of an object. Due to the high velocity impact and thermal plastic deformation, the powder particles adhesively bond to the substrate and cohesively bond together to form consolidated materials with metallurgical bonds. The powder particles and optionally the surface of the object are heated to a temperature that reduces yield strength and permits plastic deformation at low flow stress levels during high velocity impact. No melting of the powder particles takes place.

(3: Polymeric Substrates)

Suitable permanent substrates include polymer materials, which optionally can be filled with or reinforced with, e.g., metals and metal alloys, glass, ceramics, and carbon based materials selected from the group of graphite, graphite fibers and carbon nanotubes. For strength and cost reasons, filled polymers are very desirable plastic substrate materials. The term "filled" as used herein refers to polymer resins which contain powdered (i.e., 0.2-20 microns) mineral fillers such as talc, calcium silicate, silica, calcium carbonate, alumina, titanium oxide, ferrite, and mixed silicates which are commercially available from a variety of sources having a filler content of up to about forty percent by weight. If required, e.g., in the case of electrically non-conductive or poorly conductive substrates and the use of electroplating for the coating deposition, the surface of the polymeric substrates can be metallized to render it sufficiently conductive for plating. In this case the fine-grained coating layer is always substantially thicker than the metallized layer.

Poppe in U.S. Pat. No. 3,655,433 (1972) describes nonconductive plastic substrates particularly suitable for electroplating, whereby the adhesion of the metal to the plastic material is enhanced by incorporating between 1 and 25 percent by weight of a metal resinate in the polymer. Crystalline polyolefins, such as polyethylene, polypropylene and propyleneethylene copolymer, are modified with calcium resinate, zinc resinate, aluminum resinate, sodium resinate, potassium resinate or ammonium resinate to improve the adhesion of metal thereto.

Ding in U.S. Pat. No. 6,509,107 (2003) discloses polyolefin compositions that are well suited to metal plating and are easily processed into articles by various molding methods. The blends of the invention preferably include polyolefin homopolymers or copolymers, acrylonitrile-butadiene-styrene polymers, and a blend of at least one styrene monoolefin copolymer and at least one styrene diolefin copolymer. These blends have excellent platability and superior physical properties including enhanced rigidity, toughness, and dimensional stability.

(4: Metallizing Polymeric Substrates)

Nowadays plastic materials are frequently used for decorative parts in automotive and other applications due to their low cost and ease of processing/shaping by various means. It is well known in the art that plastic materials can be electroplated to achieve a particular aesthetic finish. Decorative chromium plating comprising successive electrodeposited layers of copper, nickel and chromium is the process of choice. The electrodeposit must adhere well to the underlying plastic substrate even in corrosive environments and when subjected to thermal cycling, such as are encountered in outdoor service. The prior art describes numerous processes for metallizing plastics to render them suitable for electroplating by conditioning the substrate's surface to insure electrodeposits adequately bond thereto resulting in durable and adherent metal deposits.

Liu in U.S. Pat. No. 4,604,168 (1986) describes a method of preparing the surface of molded mineral-filled Nylon® to receive an adherent electrodeposited metal coating comprising the steps of: exposing the surface to a plasma glow discharge; vacuum depositing a film of chromium or titanium onto the plasma-treated surface; vacuum depositing a nickel film onto the chromium or titanium film to prevent oxidation thereof; and then vacuum depositing a copper film onto the nickel film.

Stevenson in U.S. Pat. No. 4,552,626 (1985) describes a process for metal plating filled thermoplastic resins such as Nylon-69. The filled resin surface to be plated is cleaned and rendered hydrophillic and preferably deglazed by a suitable solvent or acid. At least a portion of the filler in the surface is removed, preferably by a suitable acid. Thereafter an electroless plating is applied to provide an electrically conductive metal deposit followed by applying at least one metallic layer by electroplating to provide a desired wear resistant and/or decorative metallic surface.

Conrod in U.S. Pat. No. 5,376,248 (1994) describes a direct metallization process wherein plastic substrates may be electrolytically plated without the need for any prior electroless plating. The process uses a specially formulated post-activator composition at an elevated temperature to treat the activated substrate with an alkaline solution containing an effective amount of metal ions such as $Cu^{+2}$ which undergo a disproportionation reaction.

Joshi in U.S. Pat. No. 6,645,557 (2003) describes a method for forming a conductive metal layer on a non-conductive surface by contacting the non-conductive surface with an aqueous solution or mixture containing a stannous salt to form a sensitized surface; contacting the sensitized surface with an aqueous solution or mixture containing a silver salt having a pH in the range from about 5 to about 10 to form a catalyzed surface; and electroless plating the catalyzed surface by applying an electroless plating solution to the catalyzed surface.

(5: Metal Plated Articles)

[Sports Articles]

Articles comprising metal-coated substrates made of plastics and composites are known in the prior art. Numerous articles, e.g., sporting goods, automotive parts, industrial components that are lightweight are prone to failure by breakage. For instance, fishing rod tip failure/breakage is a major cause of warranty returns of fishing rods to the manufacturer. As golf clubs are swung in close proximity to the ground, it is not unusual for the club head to strike the ground with considerable force, applying a large force or torque to the narrowest portion of the shaft, i.e. to the tip of the shaft that is joined to the club head. This impact can cause failure of the composite shaft at this point, causing the tip of the shaft to break at or closely adjacent to the club head.

Sandman in U.S. Pat. No. 5,538,769 (1969) describes a graphite composite shaft with a reinforced tip, suitable for use in fishing rods or golf clubs. The shaft includes a base shaft made at least partially of graphite composite material provided in one or more layers or plies. These shafts have relatively slender tips that are normally prone to impact damage. The reinforcement layer extends only part of the way up the length of the base shaft and is intended to render the shaft more resistant to impacts occurring at the tip thereby increasing the durability of the shaft without decreasing the performance of the fishing rod or golf club that incorporates the shaft. The reinforcement layer is applied by winding a suitable reinforcement tape around the outer periphery of the shaft.

Galloway in U.S. Pat. No. 6,692,377 (2004) describes an improved golf club shaft made of a composite material, such as carbon/epoxy, and a metal foil wrapped in a spiral pattern around at least a portion of the shaft body. The metal foil increases the torsional stiffness of the shaft and improves its bending stiffness, thereby enabling the first and second frequencies of the golf club to remain in a desired range.

Palumbo in U.S. Ser. No. 11/013,456 (2004), assigned to the applicant of this application, describes articles for automotive, aerospace, manufacturing and defense industry applications including shafts or tubes used, for example, as golf club shafts, ski and hiking poles, fishing rods or bicycle frames, skate blades and snowboards that are at least partially electroplated with fine-grained layers of selected metallic materials. Coated parts with complex geometry are described as well. Alternatively, articles such as conical or cylindrical golf club shafts, hiking pole shafts or fishing pole sections, plates or foils and the like can also be electroformed fine-grained metallic materials on a suitable mandrel or temporary substrate yielding strong, ductile, lightweight components exhibiting a high coefficient of restitution and a high stiffness.

Yanagioka in U.S. Pat. No. 4,188,032 (1980) discloses a nickel-plated golf club shaft made of fiber-reinforced material having on substantially its entire outer surface a metallic plating selected from the group consisting of nickel and nickel based alloys for the purpose of providing a wear-resistant coating. The electroless nickel coating of choice is 20 μm thick and the deposition time is 20 hrs, resulting in a deposition rate of 1 μm/hr.

Chappel in U.S. Pat. No. 6,346,052 (2002) discloses golf club irons with multilayer construction. The golf club head comprises a soft nickel alloy core and a hard chrome coating. The process used to produce the golf club heads involves an investment casting process in which the soft nickel alloy core is cast and the hard chrome coating is electroplated onto the core. Unlike the decorative chrome used on prior art golf clubs (hardness of about 35 to 45 Rockwell C, typical thickness between 0.05 to 0.2 mil) the chrome outer layer used in the invention is between 0.8 mils to about 1 mil (20 μm to 25 μm) thick, which is at least four times thicker than conventional applications of decorative chrome in prior art clubs. The hard chrome plating employed provides durability without compromising the superior feel characteristics of the relatively soft nickel alloy core when a golf ball is struck.

Heinrich in U.S. Pat. No. 6,679,788 (2004) discloses a golf club head where at least part of the striking face is coated with alloys of transition metals and metalloids with a hardness over 1,250 VHN by a thermal spraying method with average spray-particle velocities of over 500 m/s.

Although golf club heads and faceplates are primarily made of metal, polymeric materials can be used. In this context reference is made to Pond, U.S. Pat. No. 5,524,331 (1996) that discloses a method for casting a graphite-epoxy resin composite insert within a recess of a face of a metal golf club head. The objective of this approach is directed at displacing the weight away from the center and increasing the moment of inertia.

Schmidt in U.S. Pat. No. 5,485,997 (1996), discloses a golf putter head with a face plate insert composed of a non-metallic material such as an elastomer to enlarge the sweet spot and improve the peripheral weighting.

Numerous publications describe sport racquets reinforced and stiffened by structural straps or plates at the outer or inner surfaces, or within the wall of the handle and frame, including Stauffer (U.S. Pat. No. 3,949,988 (1976), Matsuoka in JP2000061005 (1998) and JP09285569 (1996).

Reed in U.S. Pat. No. 5,655,981 (1997) describes a shaft for a hockey stick comprising a non-metallic material coated first by a layer of a resilient yet tough polymeric material, a second layer comprised of a metal including aluminum, copper, gold and silver and a third layer comprised of a clear, resilient, tough material. The thin metallic layer is applied to the substrate by a vapor vacuum deposition process. The base layer, metallic layer and top layer have an overall thickness of less than 3 mils. The sole purpose of the thin metallic layer [maximum thickness of 0.01 mils (0.25 μm)], is to enhance the appearance.

[Polymer Ammunition Casings]

Burgess in U.S. Pat. No. 3,749,021 (1973) discloses a metal-plated plastic ammunition cartridge casing. A nickel or chromium metal film, preferably between 0.05 to 0.1 mils thick is plated onto a plastic cartridge case to increase the strength, abrasion and burn-through resistance as well as lubricity of the cartridge casing. The plastic casing may comprise a filled or a fiber reinforced plastic. A plated metal skin preferably 5 to 7 mils thick may also be employed in conjunction with non-reinforced plastic casings to increase the strength of the casing in selected areas.

Husseini in U.S. Pat. No. 6,845,716 (2005) discloses a molded plastic cartridge casing which is molded around at least a portion of the projectile. ZYTEL® resin, a modified 612 Nylon® resin to increase elastic response, available from E.I. DuPont De Nemours Co., and is a particularly suitable material for the cartridge casing. The base may be a metal base, such as a brass base, a plastic material base, a ceramic base, a composite base, or combinations thereof.

[Automotive Articles]

Various automotive articles made of plastics and composites optionally metal coated for appearance and corrosion protection are known in the prior art. Exterior automotive parts, such as a front end grilles or a wheel covers, generally contain thicker metal layers and are formulated to withstand a more aggressive environment than interior automotive parts or decorative parts for household appliances.

Wang in U.S. Pat. No. 6,010,196 (2000) describes a simulated chrome plated vehicle wheel formed by placing a thin, chrome plated wheel cover that is preferably constructed of a plastic substrate over a conventional, non-plated vehicle wheel. The wheel cover has a contour and includes surface patterns that are identical to the contour and surface patterns of the vehicle wheel thereby providing the appearance of a solid chrome plated vehicle wheel.

Vander Togtin U.S. Pat. No. 4,999,227 (1991) discloses an automotive bumper comprising a shell of injection molded platable grade ABS plastic. The plastic shell is plated with chromium metal and then backfilled by injection of ethylene ionomers. The composite structure has a pleasing metallic appearance, is lightweight, easy to manufacture yet has the structural integrity necessary to serve as impact resistant members on automobiles.

Luch in U.S. Pat. No. 4,429,020 (1984) describes metal-polymer composite articles, e.g., knobs, nuts, trimmings or ornaments, automotive components including grilles, headlamp bezels and surrounds, wheel covers, trim, hubs and like parts, having silvery hued metal surfaces. Suitable directly electroplateable polymeric materials include polyvinyls, polyolefins, polystyrenes, elastomers, polyamides and polyesters and contain carbon black and sulfur. The surface of the polymer is plated with an alloy of tin and Group VIII metals. A durable adherent Ni layer is disposed between the plastic body and the surface plating.

Anderson in U.S. Pat. No. 4,671,552 (1987) describes an improved grille guard made of rigid plastic plates such as ABS and Al or steel tubes for use on light truck-type vehicles, such as pickup trucks, vans and four-wheel drive vehicles which is substantially lighter (perhaps one-third the weight) and substantially cheaper (perhaps one-third the cost) of a comparable steel unit, yet may be provided with an appearance equivalent to a corresponding plated steel grille guard. The grille guards include end plates which may be reinforced.

Buckley in U.S. Pat. No. 6,802,232 (2004) describes brake and accelerator pedals for golf and utility vehicles made of molded plastic. The pedal arm assembly is injection molded such that the arm and the pedal member are integrally molded. The pedal arm assembly may include an internal reinforcement member that is encapsulated within the pedal arm assembly for improved structural rigidity.

Smith in U.S. Ser. No. 10/700,887 (2003) discloses a running board for a passenger car or light truck consisting of an upper molded thermoplastic section having a Class A automotive finish and a lower section having reinforcing ribs and mounting brackets. The upper section includes three layers: a paint film having a Class A automotive finish, a thin layer of thermoplastic polyolefin (TPO) and a thick layer of polypropylene. The lower section is homogeneous and may be a plastic such as TPO, polypropylene or high-density polyethylene (HDPE), which may further contain chopped, randomly oriented glass reinforcing fibers. The two sections are secured to one another about their peripheries by autogenous bonding.

OBJECTS AND SUMMARY OF THE INVENTION

It is an objective of the present invention to provide strong, lightweight articles for use in sporting goods, automotive, aerospace and industrial components, having a fine-grained structural metallic layer on a polymeric substrate. The fine-grained metal, metal alloy or metal matrix composite layer of high strength is applied to the polymer substrate, e.g., by a suitable metal deposition process or alternative bonding means including gluing, to enhance the overall strength-to-weight ratio, improve the damping characteristics and/or to provide external or internal surfaces of high hardness, high resilience, high yield strength, high scratch and wear resistance, and appealing appearance.

It is an objective of the invention to provide fine-grained metallic materials for rendering articles strong, wear and abrasion resistant, and light-weight. It is an objective to synthesize the fine-grained metallic material by a convenient and cost-effective production process including electrodeposition, physical vapor deposition (PVD), chemical vapor deposition (CVD), gas condensation and cold spraying techniques.

It is an objective of the invention to apply the fine-grained metallic coating to at least part of the surface of an article made substantially of a filled or unfilled polymer material, e.g., a graphite fiber/epoxy resin composite, polyamide, glass filled polyamide, polyester, polythalamide, polypropylene, polycarbonate, polytetrafluoroethylene (PTFE), polyvinyl chloride (PVC) or acrylonitrile-butadiene-styrene (ABS). If required, the polymer substrate surface can be rendered conductive, e.g., by coating the surface with a thin layer of silver, nickel, copper or the like or a combination of any two or all of these metals by any number of suitable processes including chemical reduction (electroless plating or chemical reduction spray), thermal spraying, chemical vapor deposition, physical vapor deposition or by any two or more of these. Alternatively, the intermediate conductive layer comprises polymeric materials with conductive particulates therein, e.g., conductive paints, conductive epoxy or polymeric adhesive materials. The conductive particulates are composed of or contain Ag, Ni or Cu or graphite or other conductive carbon or a combination of two or more thereof.

It is an objective of the invention to pretreat the surface of the polymeric substrate to achieve a surface roughness in the range of Ra=0.25 µm to Ra=25 µm prior to applying the fine-grained metallic coating. In the context of this application the Average Roughness Ra is defined as the arithmetic mean of the absolute values of the profile deviations from the mean line and is by far the most commonly used parameter in surface finish measurement.

It is an objective of this invention to provide a process capable of applying fine-grained metallic materials to tubes, shafts as well as complex-shaped articles.

It is an objective of this invention to provide shafts, tubes or other suitable shapes for sporting goods, automotive and industrial components and the like that are lightweight, resistant to abrasion, resistant to permanent deformation and do not splinter when cracked or broken.

It is an objective of this invention to provide articles, including golf club heads, golf club shafts, hockey sticks, lacrosse sticks, ski or hiking pole shafts, fishing poles, baseball/softball bats, tubes for use in bicycle frames, arrow shafts and polymer cartridge casings that are at least partially coated with or encapsulated by a fine-grained metallic layer.

It is an objective of this invention to provide articles that are at least partially coated with or encased by a fine grained metallic layer having a yield strength of at least 300 MPa, preferably at least 500 MPa and more preferably at least 750 MPa.

It is an objective of this invention to provide articles that are at least partially coated with or encased by a fine-grained metallic material and are more than 5%, preferably more than 10%, more preferably more than 20% and even more preferably more than 40% lighter than conventional articles.

It is an objective of the invention to provide a golf club capable of achieving increased flight distance performance, provide increased control over the club shaft and head and/or provide improved golf ball flying distance and accuracy characteristics, as well as improved vibration damping characteristics at low overall weight.

It is an objective of this invention to provide graphite-fiber/epoxy-based arrow shafts that are at least partially coated with or encased by a fine-grained metallic layer and provide improved stiffness and do not bend when hitting a hard object and that provide high specific strength yet remain lightweight enabling the arrows to achieve higher velocities and therefore delivering increased kinetic energy upon impact.

It is an objective of this invention to provide lightweight polymer-cased ammunition at reduced cost compared to conventional brass-cased ammunition which is suitable for use in repeating firearms.

It is an objective of this invention to at least partially coat or cover the inner or outer surface of parts including complex shapes such as racquets (e.g. for tennis, squash, badminton, etc, baseball bats, skis, golf club face plates and/or heads) or other sporting equipment, automotive components (e.g. grille guards, brackets, running boards) and industrial components with fine-grained metallic materials that are strong, lightweight, have a high stiffness, resist deflection and have higher natural frequencies of vibration, as well as display high resilience, while being manufactured by a convenient and cost-effective method.

It is an objective of the invention to provide articles with strong, hard, fine-grained metallic materials that can be further strengthened by applying a suitable heat treatment after electroplating/electroforming.

It is an objective of the invention to apply a fine-grained metal, metal alloy or metal matrix composite layer to at least part of the inner or outer surface of an article including a golf club head comprising a plastic substrate [e.g. acrylonitrile-butadiene-styrene (ABS), polyamides including Nylon®, thermoplastic polyolefins (TPOs), polycarbonate, e.g. injection or blow molded] in order to form a golf club head with (a) a high resilience face area, of light weight, and providing increased driving distance for the golf ball;
(b) damping characteristics providing superior "sound" and "feel" when e.g. striking a golf ball;
(c) high strength-to-weight ratio allowing strategic perimeter weighting of the club head; and
(d) an external surface of high hardness for improved scratch and wear resistance.

It is an objective of the invention to apply a fine-grained metal, metal alloy or metal matrix composite layer to at least part of the inner or outer surface of e.g. structural automotive components to achieve:

(a) increased strength to weight performance where a strong, thin fine-grained coating allows the design of parts where space is a constraint, replacing large bulky parts;
(b) improved stiffness where the lightweight fine-grained coating imparts an improvement in bending stiffness and an increase in natural vibration frequency, in many cases taking advantage of shape factors with location of the metal shell and/or coating;
(c) improved impact toughness, creep and fatigue performance;
(d) an external surface of high hardness for improved scratch and wear resistance.

With a view to achieving these objectives and improving the properties of commercial articles, in particular sporting equipment, automotive parts, aerospace and industrial components, the invention according to one embodiment provides an article with a fine-grained metal, metal alloy or metal matrix composite coating having an average grain size between 2 nm and 5,000 nm, a thickness of between 25 µm and 5 mm and up to as much as 5 cm and a hardness between 200 VHN and 3,000 VHN. The coating exhibits a resilience of at least 0.25 MPa and up to 25 MPa and an elastic strain limit of at least 0.25% and up to 2.00%.

According to a further embodiment of the invention, fine-grained electroformed metallic components including foils, tapes and plates are provided exhibiting an average grain size between 2 nm and 5 µm, a hardness between 400 VHN and 2,000 VHN and a yield strength of between 200 MPa and 2,750 MPa. The fine-grained electroformed metallic components are subsequently applied to and securely fastened to suitable polymeric substrates.

Polymer/metal composite articles, such as shafts and tubes incorporating the fine-grained metallic coating representing at least 5%, preferably more than 10% and even more preferably more than 20% and up to 75%, 85% or 95% of the total weight on a polymer substrate optionally containing graphite/carbon fibers, are disclosed. The torsional or bending stiffness per unit weight of the article containing the fine-grained metallic coating is improved by at least about 5% when compared to the torsional stiffness of the same article not containing the metallic coating.

GENERAL DESCRIPTION OF THE INVENTION

Suitable processes for producing or coating articles according to the invention include electrodeposition, physical vapor deposition (PVD), chemical vapor deposition (CVD), gas condensation and cold spraying techniques.

In the case electrodeposition is used as the process for producing articles and components of sporting equipment according to the invention, it comprises the steps of, positioning the metallic or metallized work piece or the reusable mandrel/temporary substrate to be plated in a plating tank containing a suitable electrolyte, providing electrical connections to the mandrel/temporary substrate to be plated and to one or several anodes, forming and electrodepositing a metallic material with an average grain size of less than 1,000 nm on at least part of the surface of the work piece using a suitable D.C. or pulse electrodeposition (5-100% duty cycle) process described in DE 10,288,323 (2005), assigned to the applicant of this application. DE 10,288,323 is incorporated herein by reference for its teaching of electrodeposition techniques which may be used in the preparation of articles according to the present invention.

Deposition rates required are at least 25 µm/h, preferably 50 µm/h and more preferably greater than 75 µm/h.

Suitable metal deposition processes can be applied to establish high-strength coatings of pure metals or alloys of metals selected from the group of Ag, Al, Au, Cu, Co, Cr, Ni, Sn, Fe, Pt, Ti, W, Zn and Zr and alloying elements selected from Mo, W, B, C, P, S and Si and metal matrix composites of pure metals or alloys with particulate additives such as powders, fibers, nanotubes, flakes, metal powders, metal alloy powders and metal oxide powders of Al, Co, Cu, In, Mg, Ni, Si, Sn, V, and Zn; nitrides of Al, B, Si and Ti; C (graphite, diamond, nanotubes, Buckminster Fullerenes); carbides of B, Cr, Bi, Si, Ti, W; and self lubricating materials such as $MoS_2$ or organic materials, e.g., PTFE. The suitable processes can be employed to create high strength, equiaxed coatings on metallic components, or non-conductive components that optionally have been metallized. In an alternative embodiment, the same metal deposition processes can be used to form a stand-alone article on a suitable temporary substrate and, after reaching the desired plating thickness, to remove the free-standing electroformed article from the temporary substrate and, in a subsequent step, apply it to the polymer substrate through the use of suitable adhesives.

Suitable permanent polymeric substrates materials include filled or unfilled epoxy resin composites, polyamide, polyester, polythalamide, polypropylene, polycarbonate, polyvinyl chloride (PVC), thermoplastic polyolefins (TPOs), polytetrafluoroethylene (PTFE) polycarbonate and acrylonitrile-butadiene-styrene (ABS). Suitable fillers include glass fibers, carbon, carbon nanotubes, graphite, graphite fibers, metals, metal alloys, ceramics and mineral fillers such as talc, calcium silicate, silica, calcium carbonate, alumina, titanium oxide, ferrite, and mixed silicates. Mineral-filled, plating-grade polyamide resins containing powdered (e.g., 0.02-20 microns) mineral fillers such as talc, calcium silicate, silica, calcium carbonate, alumina, titanium oxide, ferrite, and mixed silicates (e.g., bentonite or pumice) having mineral contents of up to about forty percent by weight and providing high strength at relatively low cost are particularly suitable substrates. Suitable polyamides are available from a number of vendors including Allied Chemical, Firestone, DuPont and Monsanto, to name a few. Other suitable substrates include acrylonitrile-butadiene-styrene (ABS) and thermoplastic polyolefins (TPO), available in "plating grades" and optionally reinforced by a variety of fillers including glass fiber.

The surface of the polymeric part as prepared by any suitable molding or forming operation is typically quite smooth and the surface roughness Ra<0.1 μm. To enhance the adhesion of the metallic coating the surface to be coated is roughened by any number of suitable means including, e.g., mechanical abrasion, plasma and chemical etching to achieve a surface roughness in the range of Ra=0.25 μm to Ra=25 μm.

The following listing describes suitable operating parameter ranges for practicing the invention:

| | |
|---|---|
| Metallic Layer Thickness Minimum: | 25 μm; 30 μm; 50 μm |
| Metallic Layer Thickness Maximum: | 5 mm, up to 5 cm |
| Minimum Average Grain Size Range: | 2 nm, 5 nm |
| Maximum Average Grain Size Range: | 1 μm, 5 μm |
| Minimum Hardness (VHN): | 200; 300; 400 |
| Maximum Hardness (VHN): | 1,000; 2,000; 3,000; |
| Deposition Rate Range: | 10-500 μm/hr |
| Yield Strength Range: | 200 MPa to 2750 MPa |
| Minimum Modulus of Resilience of the Fine-grained Metallic Layer: | 0.25 MPa, 1 MPa, 2 MPa, 5 MPa, 7 MPa |
| Maximum Modulus of Resilience of the Fine-grained Metallic Layer: | 12 MPa, 25 MPa |
| Elastic Limit Range: | 0.25%-2.00% |
| Particulate Content Range: | 2.5% to 75% by Volume |
| Fatigue resistance: | TBD |
| Minimum Substrate Surface Roughness [Ra (μm)] | 0.25, 0.4, 0.5, 1 |
| Maximum Substrate Surface Roughness [Ra (μm)] | 5, 10, 25 |

The fine-grained metallic materials of the present invention optionally contain at least 2.5% by volume particulate, preferably at least 5% and up to 75% by volume particulate. The particulate can be selected from the group of metal powders, metal alloy powders and metal oxide powders of Ag, Al, Co, Cu, In, Mg, Ni, Si, Sn, Pt, Ti, V, W and Zn; nitrides of Al, B, Si and Ti; C (graphite, carbon, carbon nanotubes, or diamond); carbides of B, Cr, Bi, Si, Ti, W; $MoS_2$; ceramics, glass and organic materials such as PTFE and other polymeric materials (PVC, PE, PP, ABS). The particulate average particle size is typically below 10,000 nm (10 μm), 5,000 nm (5 μm), 1,000 nm (1 μm), and more preferably below 500 nm.

The present invention provides for applying fine-grained metallic materials having a thickness of at least 0.025 mm, preferably more than 0.030 mm, more preferably more than 0.05 mm and even more preferably more that 0.1 mm to the surface of appropriate articles. Suitable articles include sporting goods such as golf club heads, inserts for golf club heads, face plates for golf clubs; shafts for golf clubs, hockey sticks, hiking and skiing poles, fishing poles, arrows etc. and articles with complex shapes such as baseball bats, skate blades, snow boards and tennis rackets. Suitable automotive articles include grill-guards, brake, gas or clutch pedals, fuel rails, running boards, spoilers, muffler tips, wheels, vehicle frames, structural brackets.

The fine-grained metallic materials of this invention have an average grain size under 5 μm (5,000 nm), preferably under 1 μm (1,000 nm), preferably in the range of 2 to 750 nm, more preferably between 10 and 500 nm and even more preferably between 15 nm and 300 nm.

The fine-grained metallic materials of this invention have a modulus of resilience of at least 0.25 MPa, preferably at least 1 MPa, more preferably at least 2 MPa, more preferably at least 5 MPa and even more preferably at least 7 MPa and up to 25 MPa.

The fine-grained metallic materials of this invention have an elastic limit of at least about 0.75%, and preferably greater than about 1.0%; and preferably greater than 1.5% and up to 2.0%.

To ensure part reliability, it is preferable to maintain the average thickness to average grain size ratio of the fine-grained metallic material layer at a minimum value of 10, preferably greater than 500, and more preferably greater than 1,000; and up to 1,250,000 and as much as 25,000,000.

In a preferred embodiment of the process of this invention, dispersion strengthening of the fine-grained metallic materials is performed by a subsequent heat-treatment.

According to this invention, patches or sections can be formed on selected areas of the polymeric substrate, without the need to coat the entire article.

According to this invention patches or sleeves of the fine-grained metallic materials are not necessarily uniform in thickness and can be applied in order to e.g. enable a thicker deposit on selected sections or sections particularly prone to heavy use such as golf club face plates, the tip end of fishing poles and shafts for golf clubs, skiing or hiking poles etc.

BRIEF DESCRIPTION OF THE DRAWINGS

In order to better illustrate the invention by way of examples, descriptions are provided for suitable embodiments of the method/process/apparatus according to the invention in which.

Figure 1:
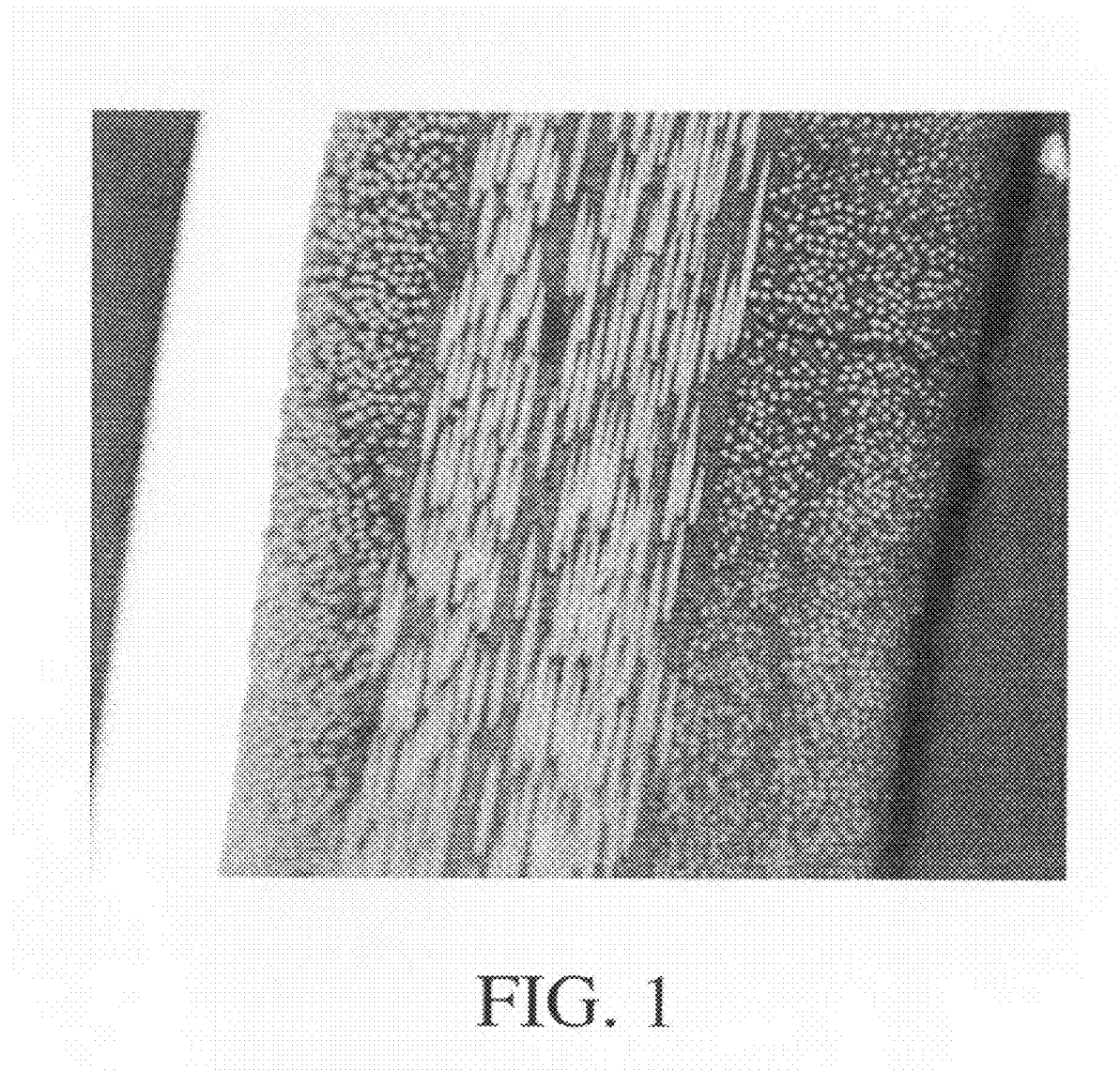
FIG. 1 is a picture of a cross-sectional view of a n-Ni coating applied to a graphite/epoxy hybrid golf shaft.

The present invention is intended for depositing fine-grained metallic materials onto articles in the form of external or internal coatings or electroforming fine-grained metallic materials comprising a metal or alloy selected from Cu, Co, Cr, Ni, Fe, Sn, Mo and Zn optionally with particulate dispersed in the fine-grained layer and subsequently applying the fine-grained metallic materials to the substrate.

DETAILED DESCRIPTION OF PREFERRED EMBODIMENT

This invention relies on producing fine-grained, coatings by suitable metal deposition processes including DC or pulse electrodeposition.

The person skilled in the art of plating, in conjunction e.g. with U.S. Pat. No. 5,352,266 (1994), U.S. Pat. No. 5,433,797 (1995) and in DE 10,288,323 (2005) [=U.S. Ser. No. 10/516, 300 (2002) and WO2004/001100 A1 2002] cited already, will know how to electrodeposit selected fine-grained metals or alloys by selecting suitable plating bath formulations and plating conditions. These patents are incorporated herein by reference for their disclosure of electrodeposition methods. Optionally, solid particles can be suspended in the electrolyte and are included in the deposit as described in DE 10,288,323 (2005).

The person skilled in the art of PVD, CVD and cold spraying will also know how to deposit selected fine-grained metallic layers on suitable substrates.

Minimizing the weight of articles, which is desirable for numerous applications, can be achieved by increasing the strength of the metallic materials by grain-size reduction. Depending on the ductility required, the grain size of e.g. Ni-based coatings in the range of 2 nm to 5,000 nm, preferably 10 nm to 500 nm provide suitable mechanical properties.

Depending on the requirements of the particular application, the material properties can also be altered, e.g., by incorporating dry lubricants (such as $MoS_2$ and PTFE), abrasion or wear resistant particles. Incorporating a sufficient volume fraction of particulate can therefore be used to further enhance the material properties. Generally, the particulates can be selected from the group of metal powders, metal alloy powders and metal oxide powders of Al, Co, Cu, In, Mg, Ni, Si, Sn and Zn; nitrides of Al, B, Si and Ti; C (graphite, diamond, nanotubes, and/or Buckminster Fullerenes); carbides of B, Si, Ti, W; self lubricating materials such as $MoS_2$, organic materials such as PTFE and polymeric materials.

As noted above, particularly suited applications for the fine-grained metallic materials disclosed herein include golf shafts, ski poles, fishing rods, hockey sticks, tennis racquets, bicycle frames and other articles and structures comprised of conventional metal, polymer or graphite composites that are coated on at least part of the interior and/or exterior surfaces, or, alternatively are net-shape formed with the use of a temporary substrate and subsequently applied to the permanent substrate. Conventional metals e.g. aluminum, copper, nickel and their alloys are relatively soft, permanently deform and break easily as a result of the bending and torsional loads encountered during use. Furthermore, these materials with conventional grain-sizes above 10 µm, generally exhibit a low resistance to abrasion and cut or scratch easily and can benefit from the fine-grained metallic layer described in this invention. Shafts made from composites of synthetic resins and filaments are more resilient under bending forces than aluminum, but lack sufficient strength. This deficiency, however, can be overcome by applying a fine-grained metallic layer according to the present invention.

The rebound distance of an object, e.g. a golf ball, tennis ball, baseball or the like when it impacts a certain material is a function of the modulus of resilience, $U_r$, of the material, which is expressed as:

$$U_r = \frac{1}{2}\sigma_y \varepsilon_y = \frac{\sigma_y^2}{2E}$$

(Metals Handbook, Ninth Edition, Volume 8, Mechanical Testing, American Society for Metals, Materials Park, Ohio, 44073)

Where $\varepsilon_y$ is the maximum true strain at the yield point, $\sigma_y$ represents the yield strength and E the modulus of elasticity. As fine-grained materials described in this invention possess yield strength values, $\sigma_y$, which are three to five and up to ten times greater that those of conventional coarse-grained metals, the resilience (rebound distance capacity) can therefore be increased nine to twenty five-fold and up to hundred fold. The modulus of elasticity E, however, is typically not affected by reducing the grain size of a given metallic material, provided the material is fully dense. The modulus of elasticity, however, can be altered e.g. by using metal matrix composites.

Material properties required for a number of applications also include a high elastic strain-to-failure limit. Low damping characteristics (low absorption and high re-release of energy) ensure that even after high load and stress deformation the material springs back to its original shape as required on strike faces, e.g., in selected automotive applications or sporting goods such as golf head face plates and baseball bats. Conventional metals have elastic strain limits of 0.65% or less. The current invention is directed to metallic materials having elastic limits of at least about 0.75%, preferably greater than about 1.0%; and preferably greater than 1.5% and up to 2.0%.

FIG. 1 is a picture of a cross-sectional view of a n-Ni coating applied to a graphite/epoxy golf shaft. Carbon fiber composites possess much higher specific rigidity and lower density than steel; however, the light-weight, carbon-fiber golf exhibits undesirable twisting of the club head relative to the shaft on down-swing and particularly at ball contact, resulting in poor accuracy and flying distance. This limitation can be overcome by coating at least 10% of the composite shaft's external and/or internal surface with the fine-grained metallic layer described.

Figure 2:
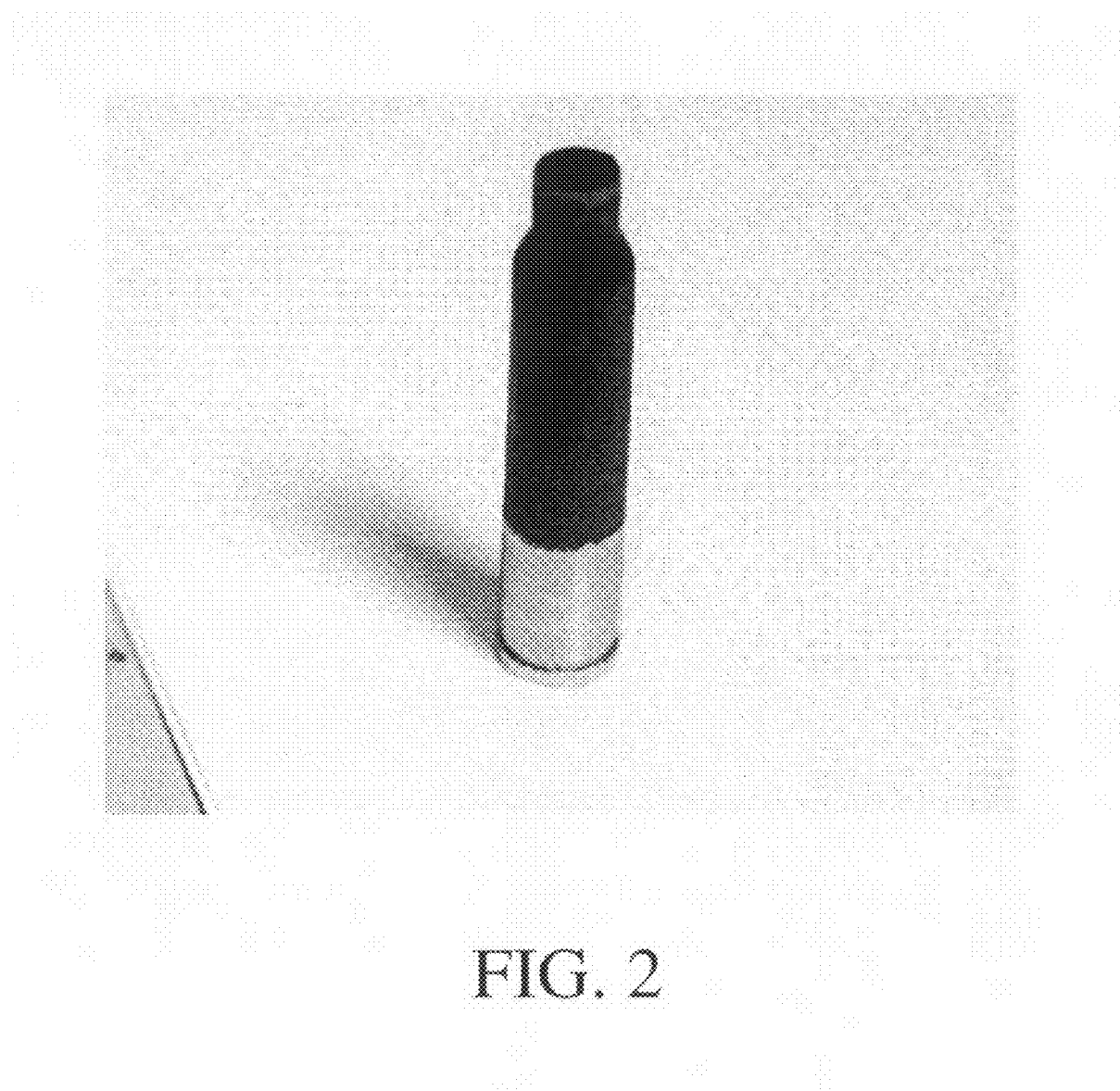
FIG. 2 is a picture of a polymer ammunition casing (0.233 caliber) that has been reinforced by a layer of fine-grained Ni-20Fe, after firing.

FIG. 2 is a picture of a polymer ammunitions cartridge with a base that has been reinforced by a layer of fine-grained Ni-20Fe. The fine-grained metallic material layer provides high strength and a low coefficient of friction.

Figure 3:
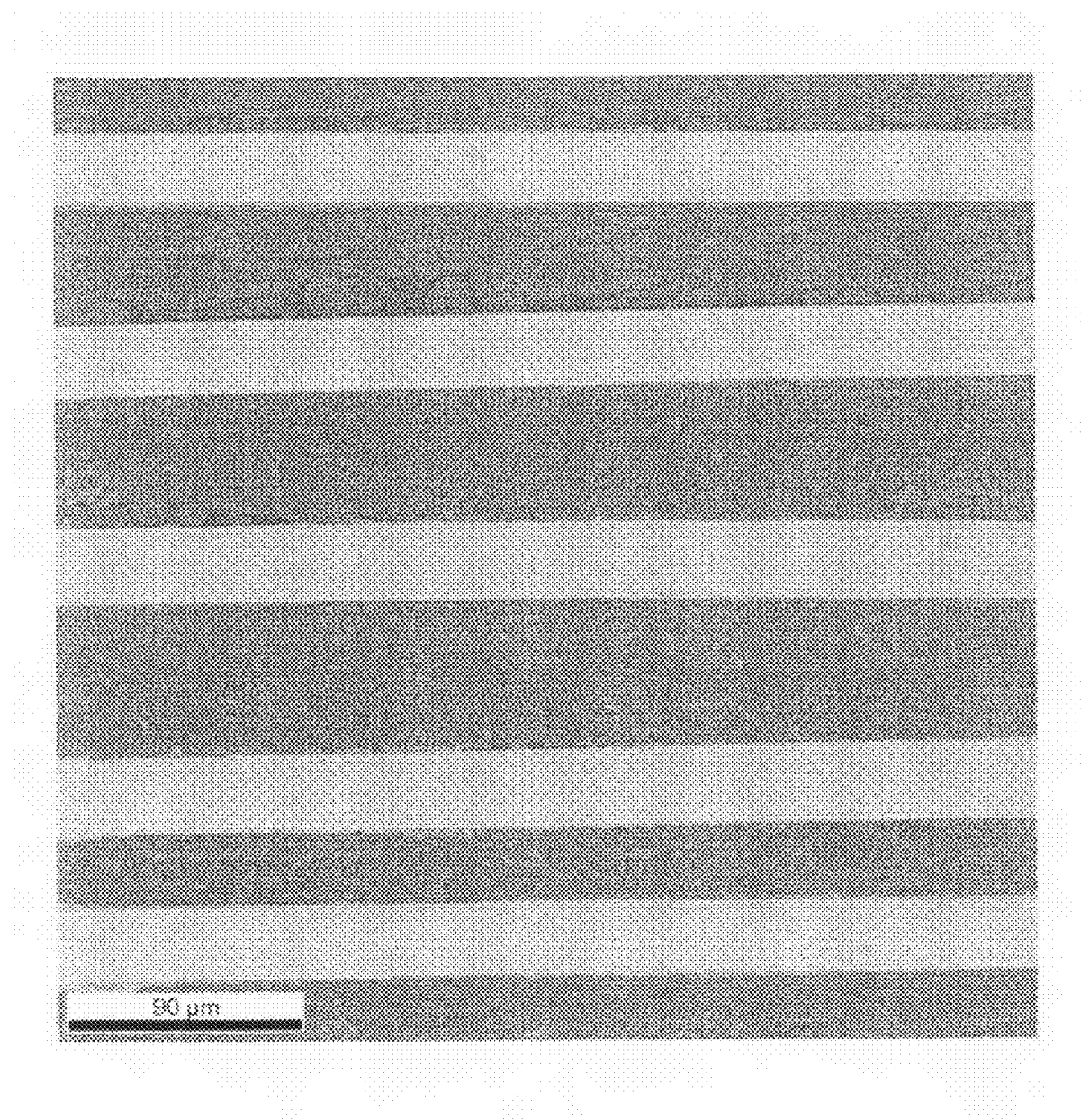
FIG. 3 is an image of a 5 mm thick n-Ni—P/epoxy laminate produced to form thick (>5 mm) laminated assemblies.

FIG. 3 is an image of a 5 mm thick n-Ni—P/epoxy resin laminate produced to form thick (>5 mm) laminated assemblies according to one preferred embodiment.

Figure 4:
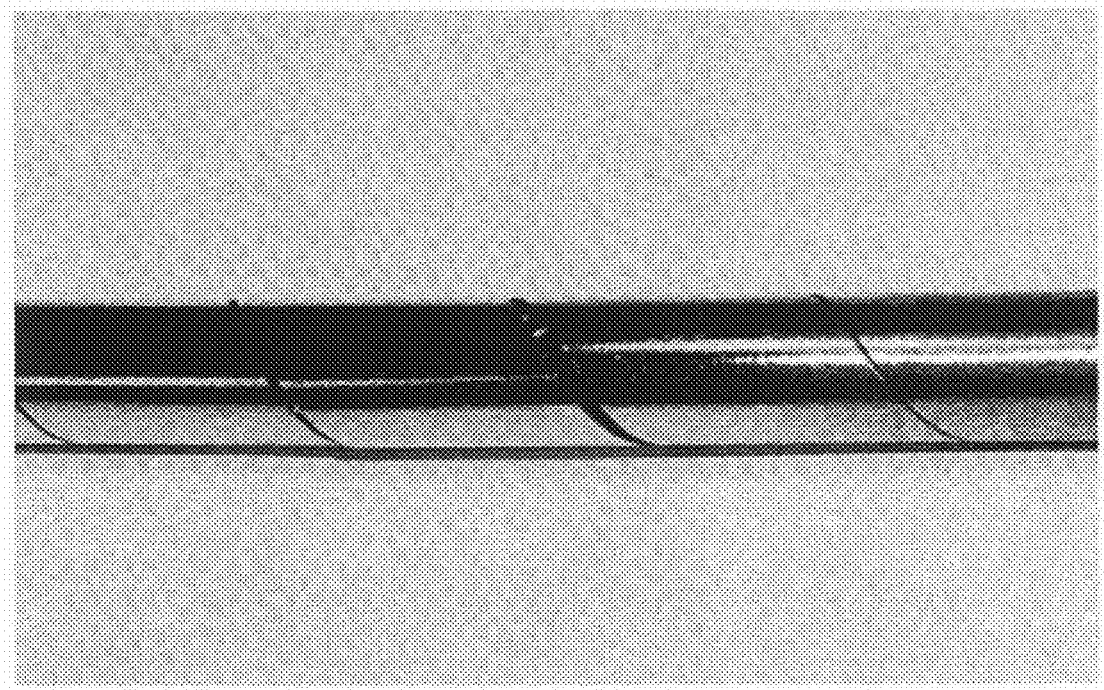
FIG. 4 is a picture of a n-Ni-10Fe adhesive tape applied to a tubular automotive part.

FIG. 4 is a picture of an n-Ni-10Fe adhesive tape applied to a tubular automotive part. As will be described in greater detail below, this fine-grained metallic layer can be applied as an adhesive tape to at least part of polymer article.

Figure 5:
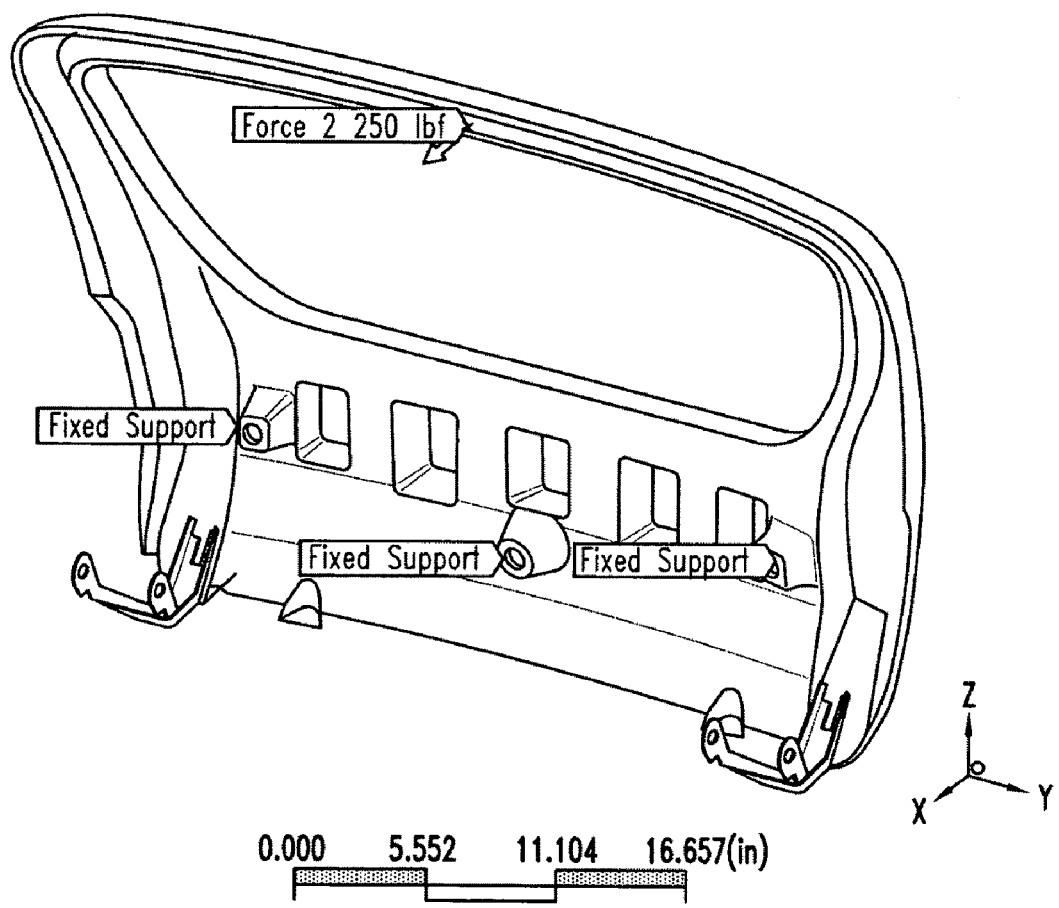
FIG. 5 shows a plastic grille-guard for a truck containing a fine-grained metallic coating to add stiffness. (6 mm plastic with 0.001" n-Ni-20Fe coating)

FIG. 5 shows a plastic grill-guard for a truck containing a fine-grained metallic coating (n-Ni-20Fe) to add stiffness. This part is blow-molded in PC/ABS and with plastic alone, does not meet the deflection and vibration requirements for the application. The performance requirements can be met by adding the stiff, lightweight fine-grained metallic coating.

Figure 6:
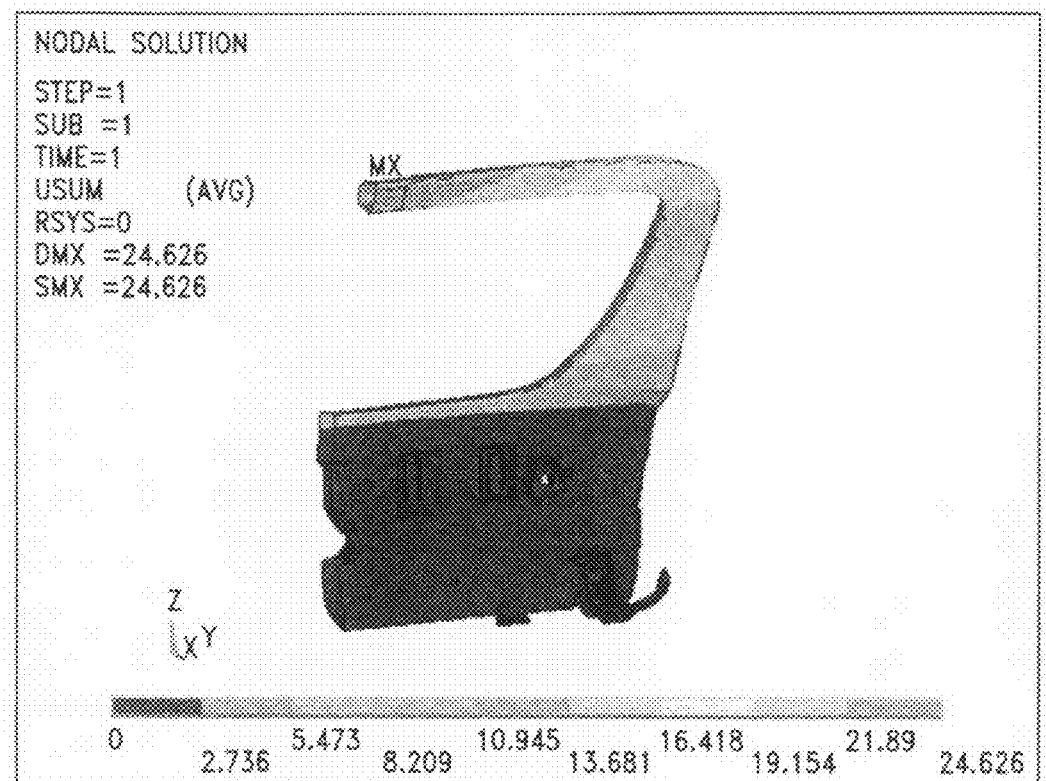
FIG. 6 shows the deflection of the plastic grill-guard containing a fine-grained metallic coating with a 250 lb load applied at the cross beam. (Target deflection: <25 mm; Performance 24.6 mm)

FIG. 6 shows the deflection encountered by the plastic grille-guard containing the fine-grained metallic coating with 250 lbf applied at the cross-beam to be 24.6 mm which meets the requirement of a maximum deflection of 25 mm.

Figure 7:
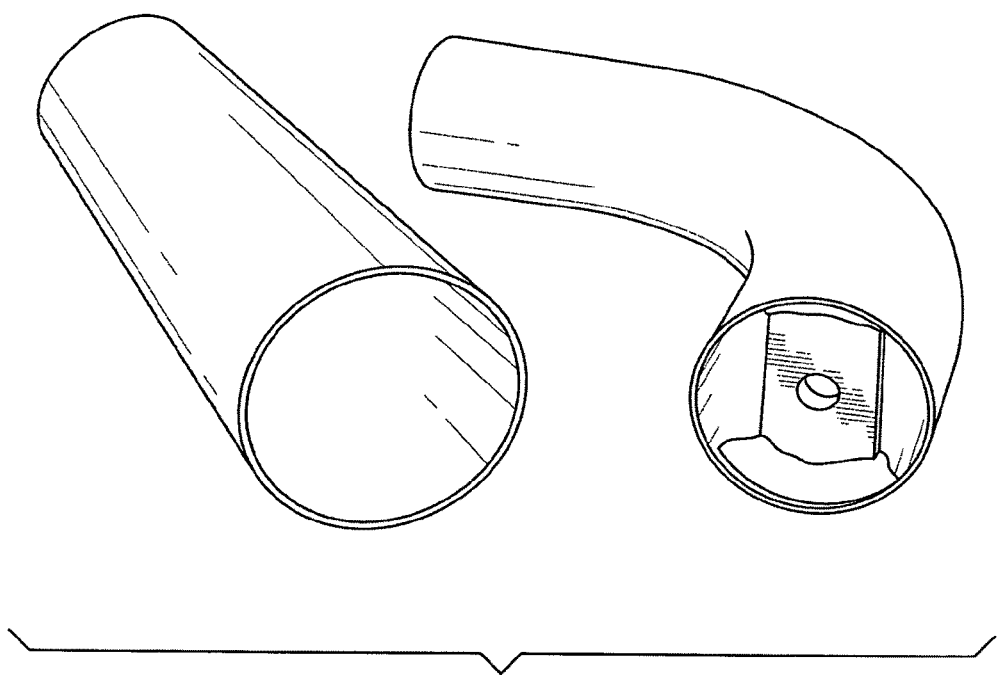
FIG. 7 shows sections of nanocoated-PC/ABS (left) and stainless steel (right) automotive running board parts.

FIG. 7 shows sections of nanocoated-PC/ABS and stainless steel automotive running board parts.

Various non-metallic materials are now commonly used in the manufacture of sporting goods, automotive components, aerospace parts or industrial articles and include polymeric resin matrix composites employing materials including carbon fibers, ceramic matrix, aramid fibers, polyethylene fibers, boron, fiberglass, and various thermoplastics including, but not limited to, polypropylene, polyethylene, polystyrene, vinyls, acrylics, nylon and polycarbonates, among others.

As highlighted a number of processes can be used to apply the fine-grained metallic material to the polymer substrates. In the case of PVD, CVD, cold spraying or the application of an adhesive fine-grained metal tape, the surface of the substrate may not require any pretreatment. If electroplating is used to apply the fine-grained metallic material a good bond can be achieved when suitably roughening the surface of the substrate. Non-conductive polymer substrates can be rendered suitable for electroplating by applying a thin layer of a conductive material e.g. by electroless deposition, physical or chemical vapor deposition, or applying electrically conductive paints by various means. It should be clear to those skilled in the art that the subject invention encompasses the use of virtually any substrate material.

According to a further preferred embodiment of the present invention, it is also possible to produce fine-grained coatings by electroplating without the need to enclose the area of the article to be coated and form a plating bath around it. Selective brush or tampon plating is a suitable alternative, particularly when only a small portion of the work-piece is to be plated. The brush plating apparatus typically employs a dimensionally stable or soluble anode wrapped in an absorbent separator felt to form the anode brush. The brush is rubbed against the surface to be plated in a manual or mechanized mode and electrolyte solution containing ions of the metal or metal alloys to be plated is injected into the separator felt.

PREFERRED EMBODIMENTS

The following examples describe specific features of selected embodiments of the invention to illustrate and provide a description for those of ordinary skill in the art.

Example 1

Fine Grained Metallic Material Properties

As highlighted, fine-grained materials can be formed using a variety of manufacturing techniques, such as sputtering, laser ablation, inert gas condensation, oven evaporation, spray conversion pyrolysis, flame hydrolysis, high energy milling, sol gel deposition, electrodeposition, physical vapor deposition, chemical vapor deposition and cold spraying. According to selected embodiments of the invention, electrodeposition and cold spraying are particularly desirable, since these coating techniques can be used to form nanostructured materials economically at high production rates. Table 1 list a number of fine-grained materials available from Integran Technologies Inc. of Toronto, Canada (www.integran.com).

Measurements of mechanical characteristics of a number of materials including metals, alloys and laminates of fine-grained coatings with polymeric materials were made in accordance with standard protocols. Commercial reference materials are listed as well including carbon fibers, various steels, aluminum and titanium. The remaining materials include fine-grained materials as well as selected hybrid materials comprising laminates of fine-grained materials and polymeric materials. Specifically to fine-grained materials the properties for n-Ni and n-Ni-20Fe are listed having an average grain size of about 20 nm. Table 2 compares the mechanical properties of a number of conventional metals, fine-grained Ni metal, fine-grained Ni—Fe alloy, along with laminates composed of fine-grained Ni—Fe alloy material and polymeric materials (graphite-fiber/epoxy, ABS or Nylon) as produced by Integran Technologies Inc. The mechanical characteristics of fine-grained materials and fine grained metal/polymeric hybrid materials render them particularly suitable for numerous commercial applications including, but not limited to, automotive parts, sporting goods, aerospace and defense application and the like requiring a relatively high strength (e.g., in terms of yield strength and ultimate tensile strength), a relatively high strength-to-weight ratio (e.g., in terms of specific strength), a relatively high resilience (e.g., in terms of modulus of resilience), a relatively high elasticity (e.g., in terms of elastic limit), a relatively high hardness, a relatively high ductility (e.g., in terms of tensile strain-to-failure), and a relatively high wear resistance (e.g., in terms of Taber Wear Index).

Fine-grained Ni, fine-grained Ni—Fe alloys as well as composites of fine-grained Ni—Fe alloys with suitable polymers containing the fine-grained metal to between 5-90% of the total weight of the laminate provide "tailor made" superior mechanical properties making them particularly suitable substitutes for metallic components in numerous commercial applications as further illustrated in Table 2.

TABLE 1

Tensile Data for Various Nanocrystalline Metals and Alloys Produced by Integran Technologies Inc.

| MATERIAL | AVERAGE GRAIN SIZE [nm] | INTERNAL STRESS | YIELD STRENGTH (0.2%) [MPa] | ULTIMATE TENSILE STRENGTH [MPa] | ELASTIC LIMIT [%] |
| --- | --- | --- | --- | --- | --- |
| Nano-Ni | 100 | (Compressive) | 690 | 1100 | 0.37 |
| Nano-Ni | 15 | (Compressive) | >900 | >2000 | 0.49 |
| Nano-Ni 10 w % Fe | 20 | Low-Med (Tensile) | 1100 | 1600 | 0.59 |
| Nano-Ni 20 wt % Fe | 20 | Low-Med (Tensile) | 1800 | 2300 | 0.97 |
| Nano-Ni 40% Fe | 20 | Low-Med (Tensile) | 1200 | 1700 | 0.65 |
| Nano-Ni 50 wt % Fe | 20 | Low-Med (Tensile) | 1100 | 1500 | 0.59 |
| Nano-Ni 60% Fe | 20 | Med-High (Tensile) | 800 | 1400 | 0.43 |
| Nano-Co2-3% P | 15 | Med-High (Tensile) | 1000-1200 | 1300-1700 | 0.52 |

TABLE 2

Mechanical Property Comparison for Various Materials Ranked in Relation to Specific Strength.

| Material | Yield Strength, [MPa] | Density, [kg/m$^3$] | Strength to Density, [MPa * m$^3$/kg] |
|---|---|---|---|
| Carbon Fiber | 1900 | 1.5 | 1267 |
| Tool Steel CPM 10V (grain size >10 μm) | 1980 | 7.4 | 268 |
| Fine-grained 80Ni-20Fe (grain size 20 nm) | 1785 | 8.6 | 208 |
| 20% fine-grained 80Ni-20Fe and 80% (55% Graphite-fiber/45% epoxy) | 577 | 2.88 | 200 |
| Tool Steel 40CrMo5 (grain size >10 μm) | 1520 | 7.7 | 197 |
| 10% fine-grained 80Ni-20Fe and 90% (55% Graphite-fiber/45% epoxy) | 426 | 2.17 | 197 |
| 55% Graphite-fiber/45% epoxy sheet molding material | 275 | 1.45 | 190 |
| 50% fine-grained 80Ni-20Fe and 50% ABS Composite | 904 | 4.8 | 188 |
| Aluminum 7065 T6 (grain size >10 μm) | 500 | 2.7 | 185 |
| 5% fine-grained Ni and 95% (55% Graphite-fiber/45% epoxy) | 306 | 1.82 | 168 |
| 30% fine-grained 80Ni-20Fe and 70% ABS Composite | 551 | 3.3 | 167 |
| Stainless Steel AISI 440C (grain size >10 μm) | 1280 | 7.8 | 164 |
| 20% fine-grained 80Ni-20Fe and 80% Nylon 66, glass reinforced Composite | 413 | 2.9 | 142 |
| Alloy Steel 34CrNiMo4 (grain size >10 μm) | 1103 | 7.8 | 141 |
| 10% fine-grained 80Ni-20Fe and 90% ABS Composite | 198 | 1.8 | 111 |
| Titanium IMI 834 (grain size >10 μm) | 500 | 4.6 | 109 |
| Aluminum 6061 T6 (grain size >10 μm) | 275 | 2.7 | 102 |
| Fine-grained Ni (grain size 20 nm) | 900 | 8.9 | 101 |
| 5% fine-grained 80Ni-20Fe and 95% Nylon 66, glass reinforced Composite | 156 | 1.9 | 82 |
| 5% fine-grained 80Ni-20Fe and 95% ABS Composite | 110 | 1.4 | 78 |
| Aluminum 356.0-T6 (grain size >10 μm) | 165 | 2.7 | 62 |
| Iron A-536 (grain size >10 μm) | 310 | 7.1 | 44 |
| Stainless Steel 304 (grain size >10 μm) | 215 | 7.1 | 30 |
| Nylon 66, glass reinforced | 70 | 1.5 | 47 |
| ABS | 22 | 1.0 | 22 |
| Conventional Nickel (grain size >10 μm) | 103 | 8.6 | 12 |

Example 2 n-Ni Coated Graphite Epoxy Golf Shaft—25% Ni

Penley™ graphite epoxy Light LS S-Flex and Penley™ G2-85X-Flex graphite epoxy shafts were used. The S-Flex shafts were characterized, stripped of the paint. The surface of the shafts was mechanically abraded using sand blasting to a surface roughness of Ra=2.1 μm and subsequently plated with coarse and fine-grained coatings. Plated S-Flex shafts and unplated X Flex shafts having a total overall weight of 89 g were performance tested. The Ni sleeves were applied to the outside of the S-Flex graphite golf club shafts ($OD_1$=0.586", tapering down to $OD_2$=0.368" over a length of 40.5") by electrodeposition in a modified Watts nickel bath and using a Dynatronix (Dynanet PDPR 20-30-100; www.dynatronix.com) pulse power supply. The starting mass of each S-Flex shaft was 71.5 g and prior to electroplating approximately 6.0 g of paint was stripped off. The coating procedure comprised three steps, namely (1) a thin electroless nickel plating to enhance the electrical conductivity using a procedure and chemicals provided by MacDermid Industrial Products (www.macindustrialproducts.com) to achieve an average metal film thickness of 0.4 micron at a deposition rate of 1.7 μm/hr and (2) electroplating to form the fine-grained or coarse-grained coating by varying the duty cycle and the peak current density. The electrolyte composition was 300 g/l nickel sulfate, 45 g/l nickel chloride, 45 g/l boric acid ($H_3BO_3$), 2 g/l saccharin and 3 ml/l NPA-91. Standard levelers and brighteners were employed and Inco nickel "R"-rounds were used as anode material. The weight of the metal coating was approximately 20 g. The electroplating conditions and metallic layer properties used are summarized in Table 3. FIG. 1 provides a picture of a cross-sectional view of the n-Ni coating applied to a graphite/epoxy golf shaft.

TABLE 3

Electroplating Conditions

| | Fine Grained | Coarse Grained |
|---|---|---|
| Deposition Temperature [° C.] | 60 | 60 |
| Duty Cycle [%] | 25 | 100 |
| Deposition Rate [μm/hr] | 50 | 8.6 |
| Average Coating Thickness: [μm] | 55 | 58 |
| Average Grain Size: [μm] | 0.025 | 10 |
| Ratio Coating Thickness/Grain Size | 2,200 | 5.8 |
| Yield Strength [MPa] | 900 | 276 |
| Hardness [VHN] | 580 | 140 |

Flexural stiffness was measured with a GolfSmith™ Frequency Analyzer and the frequency was converted to a FlexRating (S=stiff, X=extra stiff). The torque values were determined using a GolfSmith™ Torque Arm with 1 ft·lb torque 2" from the tip end of the shaft. The data are summarized in Table 4 and indicate that a significant improvement in the torque values can be obtained by replacing some fraction of the original weight of a graphite shaft with an electrodeposited coating, while maintaining the overall total weight.

Professional golfers also tested these golf clubs. The feedback received suggested that the clubs made according to this invention exhibited a superior feel when compared to conventional graphite or steel shafts. Furthermore, the fine-grained coated graphite shafts performed unlike either conventional graphite or steel shafts. Compared to graphite, the ball trajectory was reported to more consistent, as expected from the significantly improved torque value measurements.

TABLE 4

Comparison of Golf Shaft Properties

| Shaft ID | Standard Graphite Shaft | Fine Grained | Coarse Grained |
|---|---|---|---|
| Graphite Shaft Weight Before Coating [g] | 88.5 | 71.6 | 71.8 |
| Deflection Before Coating | X | S | S |
| Torque Before Coating [°] | 4.4 | 5.4 | 5.1 |
| Plating weight [g] | N/A | 19.2 | 20.0 |
| Total weight [g] | 88.5 | 88.8 | 89.8 |
| Deflection After Coating | X | X | X |
| Torque After Coating [°] | 4.4 | 3.6 | 4.0 |

Similar performance benefits are achieved when the coated articles were fishing rods, hockey sticks, baseball bats, tennis racquets, bicycle frames and the like as well as automotive, aerospace and other industrial components.

Example 3 n-Ni Coated Graphite Epoxy Golf Shaft—5-90% Ni

Example 2 illustrates the benefit of relatively thin, fine-grained metallic coatings with a thickness of >25 µm and a fine-grained metal content of about 22% of the total weight. To investigate the effect of further increasing metal content, hybrid graphite epoxy/metal golf shafts were prepared and characterized. True Temper Prolaunch™ (A-Flex) driver graphite epoxy shafts were mechanically abraded using Scotch-Brite® to an average surface roughness of Ra=1.7 µm and subsequently coated with fine-grained metallic nickel layers of varying weights. The process and the characterization techniques employed are described in Example 2. Table 5 shows the torsional stiffness as a function of the metal content of graphite/metal composite golf shafts. The data reveal that the torsional stiffness per unit weight of the article containing a metallic coating representing 5% of the total weight is improved by at least about 5% when compared to the torsional stiffness of the same article not containing the metallic coating. Further improvements in the torsional stiffness are obtained when the relative metal content of the hybrid shaft is further increased at a rate of approximately one percent improvement in torsional stiffness per percent relative metal content.

The torque and deflection data indicate that a significant performance improvement can be obtained by increasing the relative metal weight of the composite graphite epoxy/metal shafts. Graphite/metal composite golf shafts incorporating a metallic coating representing at least 5%, preferably more than 10% and even more preferably more than 20% of the total weight provide a substantial improvement over the performance of uncoated graphite shafts.

Similar performance benefits were achieved when the coated articles were fishing rods, hockey sticks, baseball bats, Lacrosse sticks, tennis racquets, bicycle frames and the like as well as automotive, aerospace and other industrial parts.

TABLE 5

Torsional Stiffness Comparison of Shafts

| Metal Content of Hybrid Shaft [Weight % n-NiFe] | Relative Change in Torsional Stiffness per Unit Weight [% per degree/kg] |
|---|---|
| 0 | 0 |
| 5 | 6 |
| 25 | 30 |
| 43 | 55 |
| 55 | 70 |
| 68 | 83 |
| 75 | 95 |

Example 4

Arrow Shafts; NiFe on Graphite/Epoxy—Brush Plating

Over time a number of articles including archery arrows, baseball bats, hockey and Lacrosse sticks, bowling pins progressed from being made out of wood to aluminum. Specifically to e.g. arrows, aluminum arrows are about 25% lighter than cedar wood arrows but with repeated use aluminum arrows tend to bend causing inconsistent trajectories and loss in accuracy. More recently graphite composite arrows appeared, made from carbon fibers/polyvinyl or polyester resins. Graphite composite arrows are lighter and tougher than aluminum and they do not bend when striking a hard object. The lighter weight also leads to increased speed resulting in delivering higher kinetic energy on impacting the target. State of the art graphite composite arrows, however, also have a number of limitations. They tend to oscillate along the shaft, which causes inaccuracies in flight and reduced penetration after hitting game. Due to the relatively limited "spine weight" and their low stiffness, it is difficult to use them with bows with more than 50 lb draw weight. Furthermore, upon penetrating the target the friction generated heats up the tip section of the shaft to a temperature of over 150-200° C., which is significantly above the maximum temperature the graphite fiber/epoxy resin composite is able to withstand, resulting in degradation of the graphite fiber/epoxy resin composite shaft, deterioration of its performance and ultimately failure of the shaft.

To demonstrate the performance of composites made of fine-grained metallic materials with polymers selected 30" arrows were used including ⅛" outer diameter graphite-epoxy/fiberglass arrows and 3/16" outer diameter Aluminum cored graphite-epoxy/fiberglass arrows. To improve the shaft performance and reduce the impact damage the test shafts were reinforced with an outer layer (thickness: 4 mils) of a fine-grained Ni-20Fe alloy around the tip section after mechanically abrading the surface to be plated with Scotch-Brite® to an average surface roughness of Ra=0.6 µm. The reinforcement layers extended part of the way (e.g. 4") or all the way up the length of the base shaft making the shaft more resistant to impacts and thus increasing its durability.

The brush plating procedure described in U.S. Ser. No. 10/516,300 was followed for coating arrow shafts with fine-grained Ni-20Fe with an average grain size of 20 nm using a selective plating unit supplied by Sifco Selective Plating (www.brushplating.com). A DC power supply was employed. Standard substrate cleaning and activation procedures provided by Sifco Selective Plating were used. After the portion of the shaft to be plated was abraded and metallized by silver spraying, a fine-grained Ni-20Fe layer was plated onto the outside casing from the base to between about half to the entire overall length by mounting the shaft in a rotator which also provided for the electrical contact to the metallized layer. A graphite anode brush wrapped in a suitable absorber was brought into contact with the rotating arrow to deposit the fine-grained Ni-20Fe layer (average grain size 20 nm). The electrolyte was a modified Watt's bath for nickel containing 300 g/l nickel sulfate, 45 g/l nickel chloride, 45 g/l boric acid ($H_3BO_3$), 2 g/l saccharin and 3 ml/l NPA-91. To form the desired n-Ni-20Fe alloy 12 g/l $FeCl_2.H_2O$, 81 g/l $FeSO_4.7H_2O$ and 9 g/l Na-Citrate were added to the modified Watts bath. Standard levelers and brighteners were employed. The n-Ni20Fe was deposited using DC (100% duty cycle) at a current density of 100 mA/cm² and 60° C.

Test samples were prepared with the fine-grained Ni-20Fe coating representing between 5 and 50% of the total arrow weight. The shafts were fitted with field tips, nocks and suitable vanes and submitted to tests using a compound bow with a draw weight of 60 lb. Overall the arrows containing the fine-grained metallic coating consistently outperformed the uncoated arrows. Samples with a fine-grained metal layer of at least 5% of the total weight of the arrow displayed a performance superior to that of conventional graphite fiber/ epoxy and aluminum arrow shafts. Reinforcing the arrow shaft in the tip section (2" to 8") with a 0.001"-0.008" thick fine-grained coating proved particularly beneficial.

Example 5

Polymer Ammunition Casings; NiFe on Glass-Filled Nylon

Ammunition containing plastic components including polymer cartridge casings are known but to date have not been produced economically in commercial quantities with acceptable safety and consistent ballistic characteristics. Lightweight, polymer-cased ammunition utilizing standard projectiles, primers, and propellants have the potential to significantly reduce the weight of ammunition. Deficiencies encountered to date include:

- the possibility exists that the projectile can be pushed into the cartridge casing or fall out;
- moisture uptake and sealing problems can occur failing to keep the propellant dry;
- a poor fit in the chamber can cause problems with inconsistent projectile accuracy due to the variation in the gas pressure during firing;
- during the residence time of the cartridge in the weapon (after chambering and before firing) the cartridges can be exposed for some time to high temperatures of up to 200 or even 300° C., e.g., in automatic weapons which can degrade the polymer;
- when fired plastic casings can permanently deform or provide insufficient elastic spring back causing difficulties during extraction;
- portions of the polymer cartridge casing can break off or disintegrate upon firing;
- problems can be encountered with ease and reliability of spent polymer cartridge extraction requiring a metal base or a metal insert;
- jamming in automatic weapons can occur particularly during ejection of the casing;
- insufficient lubricity of the casing fails to ensure reliable extraction and ejection; and
- excessive cost can be incurred due to complex designs and manufacturing processes required.

To demonstrate the performance of composites made of fine-grained metallic materials with polymers 5.6 mm (0.223 caliber) polymer ammunition casings made of Zytel®, a type 66 polyamide containing 40% glass filler, were used and were reinforced with a fine-grained metallic layer. Prior to plating, the outside diameter of the casing to be plated was reduced to accommodate 0.001" to 0.010" thick coatings without changing the outer diameter. The average surface roughness was determined to be Ra=0.5 µm. No adjustments were made to the inner diameter of the casing in case the inside surface was plated. The electrolyte described in Example 4 was used for coating all the polymer ammunition casings with fine-grained Ni-20Fe with an average grain size of 20 nm. Inco Ni "R" rounds and electrolytic iron chips were used as anode material in a typical tank plating set up. The portion of the casing not to be plated was masked off and the area to be plated metallized by silver spraying. The casing was mounted in a suitable holder and submersed into the plating tank. The fine-grained Ni-20Fe layer was plated onto the outside casing from the base to between about half to the entire overall length while the casing was rotated in the tank using DC (100% duty cycle) at a current density of 100 mA/cm$^2$ at 60° C. Test samples were prepared with the fine-grained Ni-20Fe coating representing between 5 and 50% of the total casing weight. The casings were fitted with primers, suitable powder charges and 55 grain FMJ projectiles and submitted to test firing in an M-16 weapon. The performance of the cartridges with respect to chambering, ejecting and accuracy was monitored. Spent casings were examined with respect to their mechanical integrity and signs of disintegration/cracking. Cracks and signs of polymer disintegration were observed frequently in the uncoated casings. Depending on the coating thickness used, cracks and disintegration of the polymer was observed. Cracks in the fine-grained coating were at times noted, too, typically initiated in the extractor groove, where the coating was the thinnest. Overall, the casings containing the fine-grained metallic coating consistently outperformed the uncoated casings. Samples with a fine-grained metal layer of at least 5% of the total weight of the casing displayed a performance equivalent to that of conventional brass casings. The overall weight of the casings containing fine-grained coatings displaying acceptable overall performance was reduced by between 10 and 75% when compared to brass cartridges. Benefits in reliability and performance of the metal-polymer hybrid casings were observed irrespective of whether the casing was coated on the outer surface, the inner surface or both. Reinforcing the casing near the base as illustrated in the sample shown in FIG. 2 proved particularly beneficial.

Example 6 n-Ni Coated ABS—5-90% NiFe

Suitable materials for use in golf heads include thermoplastic elastomers including styrene co-polymers, co-polyesters, polyurethanes, polyamides, olefins and vulcanates. Suitable thermoset polymers include epoxides, polyimides and polyester resins. In this experiment a 1 mm thick faceplate made of a platable ABS chemically etched using a sulfuric-acid/chromic-acid solution. The average surface roughness was determined to be Ra=0.45 µm. After metallizing using the chemical Ag-spray the coupons were plating using a conventional tank electroplating cell setup and employing the Watts bath as described in Example 2 to deposit a 0.4 mm thick layer of fine-grained nickel on one surface. The nickel-layer surface was polished to a "mirror finish" ultimately using 1 µm diamond paste. A sample containing a 0.4 mm thick layer of conventional coarse-grained nickel was prepared as described in Example 2. The two samples were suitably mounted on a horizontal plate and a steel ball (3 mm diameter) was dropped from a height of 60 cm onto the samples. The rebound height was determined to be 2.9 mm for the conventional nickel layer, while the rebound height of the fine-grained nickel sample was determined to be 28.8 mm. The rebound height off the fine-grained Ni-sample improved by a factor of approximately 10, as expected based on the 10 fold improvement in resilience (Table 6).

TABLE 6

Electroplating Conditions

| | This Invention (fine grained) | Prior Art (coarse grained) |
|---|---|---|
| Average Coating Thickness: [micron] | 400 | 400 |
| Average Grain Size: [µm] | 0.025 | 20 |
| Ratio Coating Thickness/Grain Size | 16,000 | 20 |
| Deposition Rate [µm/hr] | 45 | 18 |
| Duty Cycle [%] | 25 | 100 |
| Deposition Temperature [° C.] | 60 | 60 |

TABLE 6-continued

| | Electroplating Conditions | |
|---|---|---|
| | This Invention (fine grained) | Prior Art (coarse grained) |
| Yield Strength [MPa] | 900 | 276 |
| Resilience, MPa | 1.93 | 0.18 |
| Rebound height [cm] | 28.8 | 2.9 |
| Improvement in Rebound Height [%] | 893 | 0 |

Example 7 n-Co—TiO2 Faceplates MMC on Polyurethane

A nanocrystalline Co—TiO$_2$ nanocomposite of 0.12 mm average coating thickness was deposited onto a number of polyurethane golf head faceplates from a modified Watts bath for cobalt using a soluble anode made of electrolytic cobalt pieces and a Dynatronix (Dynanet PDPR 20-30-100) pulse power supply. The electrolyte used comprised 300 g/l cobalt sulfate, 45 g/l cobalt chloride, 45 g/l boric acid, 2 g/l saccharin and 4 ml/l NPA-91. Suspended in the bath were 0-500 g/l titania particles (<1 μm particle size) with the aid of 0-12 g/l Niklad™ particle dispersant (MacDermid Inc.). The electroplating conditions and metallic layer properties used are summarized in Table 7. Prior to electroplating the polyurethane substrate surface was mechanically abraded using Scotch-Brite® to an average surface roughness of Ra=1.5 μm followed by metallizing using commercial silver spraying.

A series of coated samples was produced using the modified Watts bath with the addition of TiO$_2$ particles (particle size <1 μm) ranging from 50 g/l to 500 g/l. Table 8 illustrates the properties of the deposits.

TABLE 7

| Electroplating Conditions | |
|---|---|
| Deposition Temperature [° C.] | 60 |
| Duty Cycle [%] | 25 |
| Deposition Rate [μm/hr] | 40 |
| Average Coating Thickness: [μm] | 120 |
| Average Grain Size: [μm] | 0.015 |
| Ratio Coating Thickness/Grain Size | 8,000 |

TABLE 8

Co—TiO$_2$ Metal Matrix Composite Properties

| Sample | Bath TiO$_2$ Concentration [g/l] | Dispersant Concentration [g/l] | Grain-Size of Co deposit [nm] | TiO$_2$ Fraction in Deposit [Volume %] | Microhardness [VHN] |
|---|---|---|---|---|---|
| Control | 0 | 0 | 16 | 0 | 490 |
| 1 | 50 | 0 | 15 | 19 | 507 |
| 2 | 100 | 1.5 | 15 | 23 | 521 |
| 3 | 200 | 3 | 17 | 32 | 531 |
| 4 | 300 | 6 | 17 | 38 | 534 |
| 5 | 500 | 12 | 16 | 37 | 541 |

Example 8 n-NiP Faceplates/Brush Plated, HT Prepare Laminate Gluing Together with Adhesive 10×10 cm wide, 50 μm thick nanocrystalline Ni-0.6P foils (average grain size: 13 nm, 780 VHN) were deposited onto a polished Ti cathode immersed in a modified Watts bath for nickel as described in U.S. Ser. No. 10/516,300 (=WO2004/001100). A soluble anode of Ni rounds contained in a titanium wire basket was used. The following plating conditions were employed:

Average current density: 150 mA/cm$^2$

Duty Cycle: 100%

Deposition Rate: 0.075 mm/hr

Electrolyte temperature: 65° C.

Electrolyte circulation rate: 0.15 liter per min and cm$^2$ cathode area

The electrolyte used comprised 137 g/l nickel sulfate, 36 g/l nickel carbonate, 4 g/l phosphorous acid and 2 g/l saccharin. The electroplating conditions and metallic layer properties used are summarized in Table 9. The fine-grained Ni-0.6P foils were subsequently heat-treated as indicated to further enhance the mechanical properties by precipitation hardening.

A laminate part was prepared by stacking and joining 10 heat-treated Ni-0.6P foil samples heat-treated at 400° C. using an epoxy resin adhesive (3M™ Scotch-Weld™ Epoxy Adhesive 1838 B/A; www.3m.com). FIG. 3 shows a cross-sectional view of the laminate. The laminate was cut to size for use as a face plate insert on a golf club head.

TABLE 9

| Electroplating Conditions | |
|---|---|
| Deposition Temperature [° C.] | 65 |
| Duty Cycle [%] | 100 |
| Deposition Rate [μm/hr] | 50 |
| Average Coating Thickness: [μm] | 50 |
| Average Grain Size: [μm] | 0.013 |
| Ratio Coating Thickness/Grain Size | 3,846 |
| Hardness [VHN] | 780 |
| Hardness after Heat Treatment (400° C./20 min) [VHN] | 890 |
| Hardness after Heat Treatment (400° C./20 min + 200° C./11 hrs) [VHN] | 1010 |

Alternatively, fine-grained metal and metal-alloy foils can be prepared by CVD or PVD, e.g., using a reel-to-reel system. Similarly, cold spraying as described in U.S. Pat. No. 5,302,414 can be used to e.g. prepare fine-grained metal and metal-alloy layers.

Example 9 n-NiFe Tape on Graphite/Epoxy Resin Mountain Bike Frame Tube

Using a drumplater nanocrystalline Ni-25Fe alloy foils (average grain size 15 nm, Hardness: 750 Vickers) were deposited on a rotating Ti drum partially immersed in a modified Watts bath for nickel as described in U.S. Ser. No. 10/516,300 (=WO2004/001100) and in Example 8. The 15 cm wide 100 μm thick nanocrystalline foil, was electroformed onto the drum cathodically, using a soluble anode made of a titanium wire basket filled with Ni rounds using a current density of 150 mA/cm² and 100% duty cycle at 60° C. The electrolyte circulation rate remained at 0.15 liter/min/cm² cathode area. The electrolyte contained 260 g/l NiSO$_4$.7H$_2$O, 45 g/l NiCl$_2$.6H$_2$O, 12 g/l FeCl$_2$.4H$_2$O, 45 g/l H$_3$BO$_3$, 46 g/l Sodium Citrate, 2 g/l Saccharin, 2.2 ml/l NPA-91 at pH 2.5. The iron concentration in the bath was maintained by continuous addition of an Iron solution containing 81 g/l FeSO$_4$.7H$_2$O, 11 g/l FeCl$_2$.4H$_2$O, 13 g/l H$_3$BO$_3$, 9 g/l Sodium Citrate, 4 g/L H$_2$SO$_4$ and 0.5 g/l Saccharin at pH 2.2 at an addition rate of addition: 0.3 l/hr.

A self adhesive fine-grained metal tape was prepared by applying a commercial pressure sensitive adhesive (Dow Corning® PSA-7355; www.dowcorning.com) on one side, followed by curing and slitting the adhesive tape into 1" wide strips. The tape was spirally wound onto the outer periphery of a graphite/epoxy resin mountain bike frame after it was mechanically abraded using Scotch-Brite® to a surface roughness of Ra=0.75 μm to permanently bond it thereto as illustrated in FIG. 4 to provide improved stiffness, surface hardness and impact resistance.

Example 10

Grille Guard or Something Automotive

A blow-molded 6 mm thick PC/ABS truck grille-guard as illustrated in FIG. 5 did not meet the deflection and vibration requirements for this automotive application namely a deflection of less than 1" with a 250 lb force applied and a first natural frequency of above 30 Hz. Upon analysis, stiffening by increasing the plastic thickness required to stiffen the part went beyond the limitations of the blow molding process used. To meet the stiffness requirements, formed steel brackets screwed onto the back plate could be used but increases the cost and weight of the grille guard. A 0.001" (0.025 μm) thick lightweight, fine-grained Ni-20Fe coating was applied to reinforce the part after abrading the surface to be coated to an average surface roughness of Ra=0.6 μm. The addition of the fine-grained metal layer to the polymer part substantially increased the stiffness of the part and met the deflection and frequency performance required. The fine-grained Ni-20Fe coating only added 153 grams of weight to the part, keeping it below the target weight of 50 lbs. FIG. 6 shows the deflection of grille guard containing a fine-grained metallic coating with 250 lbf applied at the cross beam. The maximum deflection tolerated is 1" (25 mm) and the deflection encountered with the part as illustrated is 24.6 mm. Similarly, with respect to the natural frequency the grille guard containing a fine-grained metallic coating displayed a frequency of 30.3 Hz which met the requirement of the target frequency of over 30 Hz.

As illustrated in Table 10, although other metallic coatings would add the same stiffness due to similar Young's modulus, they would have not been able to withstand the high stresses (250 MPa at 10° C. resulting in 1,500 MPa over full temperature range) placed on the coating. High stresses would also be encountered when applying the 250 lbf load when up to 900 MPa of stress would be placed on the coating. Table 11 summarizes the various design iterations; only the design with the n-Ni-20Fe coating met all of the performance criteria.

TABLE 10

Yield Strength Comparison of Selected Metallic Materials

| Metallic Coatings | Elastic Modulus [GPa] | Yield Strength [MPa] |
|---|---|---|
| Conventional Ni | 185 | 220 |
| Sulfamate Ni | 185 | <550 |
| Nicoloy | 185 | <1000 |
| Fine-grained Ni-20Fe | 185 | 1785 |

TABLE 11

Summary of Performance Results

| Part | Plastic Thickness | Static Def. (specification: <25 mm) | 1$^{st}$ Natural Frequency (specification: >30 Hz) | Part Mass |
|---|---|---|---|---|
| PC/ABS | 4 mm | >100 mm | 16 Hz | 5.2 kg |
| PC/ABS + Steel brackets | 6 mm | 36 mm | 30 Hz | 9.5 kg |
| Stiffer PC/ABS | 6 mm | 33 mm | 26 Hz | 7.8 kg |
| Stiffer PC/ABS with 0.001" n-Ni-20Fe coating | 6 mm | 24.6 mm | 30.3 Hz | 8.0 kg |

Example 11 n-NiFe Coated ABS Running Board

To demonstrate the benefits of polymer parts reinforced with a nanostructured material, commercial stainless steel automotive running boards were sourced. Standard 3.5" OD PC/ABS tubes were also obtained for plating to achieve a structural shell with similar stiffness to the steel running board. After suitable activation (initially, the substrate surface was roughened with Scotch-Brite® to enhance coating adhesion); each tube was metallized using silver spray, followed by a Cu pre-plate to render it conductive enough for subsequent electrodeposition of the fine-grained material. The entire outer surface was coated with a layer of n-Ni-20Fe (average grain size 20 nm) as described in Example 5 to a thickness of 0.009". The average surface roughness was varied between Ra=0.5 μm and Ra=15.0 μm by changing the abrasive media accordingly. After the application of the fine-grained coating, the surface roughness decreased to between about ½ and ⅔ of the original value due to the leveling effect of the electrodeposited layer. Sections of the original metal running board and nanocoated PC/ABS running boards are shown in FIG. 7.

Table 12 indicates that a 3.5" diameter PC/ABS tube with a 0.009" coating of n-Ni-20Fe (average grain size 20 nm) enhances the stiffness of the polymer part to be equivalent to the steel part yet yield a 43% weight savings.

TABLE 12

Results of Stiffness Analysis for Nanoplated Running Boards

| Substrate | 304 Stainless Steel | PC/ABS 30% glass fill | PC/ABS 30% Glass Fill |
|---|---|---|---|
| Outside Diameter [in] | 3.0 | 3.5 | 3.5 |
| Thickness [in] | 0.06 | 0.71 | 0.13 |
| Density [g/ml] | 8 | 1.31 | 1.31 |
| E-Modulus of Elasticity [MPa] | 205 | 8 | 8 |
| El-Stiffness [N·m$^2$] | 52.0 | 21.4 | 6.3 |
| Length [cm] | 200 | 200 | 200 |
| Mass [kg] | 5.82 | 10.49 | 2.26 |
| Fine Grained Coating | N/A | N/A | n-Ni-20Fe |
| Thickness [in] | — | — | 0.009 |
| Density [g/ml] | — | — | 8.6 |
| E-Modulus of Elasticity [MPa] | — | — | 185 |
| El-Stiffness [N·m$^2$] | — | — | 45.7 |
| Mass [kg] | — | — | 1.07 |
| Finished Product | 304 Stainless Steel | PC/ABS 30% glass fill | PC/ABS 30% Glass Fill-n-Ni-20Fe |
| El-Stiffness [N·m$^2$] | 52.0 | 21.4 | 52.0 |
| Mass [kg] | 5.82 | 10.49 | 3.33 |
| Weight Savings versus 304 SS [%] | | −80 | 43 |

The nanostructured coatings passed standard peel tests, although it was observed that the coating adhesion improved significantly with increasing the surface roughness of the substrate before plating. Specifically a surface roughness of the substrate in the Ra=0.25 μm to Ra=5.0 μm range proved particularly beneficial while not compromising the appearance. Selected parts were exposed to a variety of mechanical tests. The results indicated that hybrid nanostructured metal/polymer running boards provided adequate durability and performance while reducing the weight by 40-50% when compared with, e.g., steel running boards.

Similar performance benefits are achieved when substrates including carbon/epoxy, PTOs, polyamide, polypropylene and wood were coated using the same approach.

Variations

The foregoing description of the invention has been presented describing certain operable and preferred embodiments. It is not intended that the invention should be so limited since variations and modifications thereof will be obvious to those skilled in the art, all of which are within the spirit and scope of the invention.

What is claimed is:

1. An article comprising:
    (i) a permanent substrate comprising a polymer material with or without particulate addition, and
    (ii) a fine grained metallic layer having a grain size in the range of 2 to 5,000 nm, a thickness ranging from 30 microns to 5 cm, a modulus of resilience ranging from 0.25 to 25 MPa; and wherein a surface of said polymer substrate is coated over at least a portion thereof with the fine grained metallic layer or an intermediate conductive layer which is coated with said fine grained metallic layer and has an average surface roughness of Ra 0.25 to 25 micron over at least the portion which is coated.

2. An article according to claim 1, wherein said article contains a layer intermediate (i) and (ii) selected from the group of a metallic intermediate layer, a polymeric adhesive intermediate layer and a conductive polymeric intermediate layer containing conductive particulates.

3. The article of claim 1 which has a yield strength of at least 25 MPa and a bending stiffness per unit weight improved by at least 5% compared to that of the same article without a fine grained metallic layer and an intermediate layer.

4. The article of claim 3 which is a mold.

* * * * *